US011388699B2

(12) United States Patent
Raza et al.

(10) Patent No.: US 11,388,699 B2
(45) Date of Patent: Jul. 12, 2022

(54) COMMUNICATION BETWEEN NETWORK NODES

(71) Applicant: Kabushiki Kaisha Toshiba, Minato-ku (JP)

(72) Inventors: Usman Raza, Bristol (GB); Magnus Stig Torsten Sandell, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 156 days.

(21) Appl. No.: 16/829,341

(22) Filed: Mar. 25, 2020

(65) Prior Publication Data

US 2021/0306993 A1    Sep. 30, 2021

(51) Int. Cl.
| H04W 72/04 | (2009.01) |
| H04L 1/18 | (2006.01) |
| H04L 1/00 | (2006.01) |
| H04J 3/06 | (2006.01) |

(52) U.S. Cl.
CPC ....... *H04W 72/0406* (2013.01); *H04J 3/0661* (2013.01); *H04L 1/0063* (2013.01); *H04L 1/1887* (2013.01); *H04W 72/0446* (2013.01)

(58) Field of Classification Search
CPC .......... H04W 72/0406; H04W 72/0446; H04L 1/1887; H04J 3/0061; H04J 1/0063
See application file for complete search history.

(56) References Cited

U.S. PATENT DOCUMENTS

| 6,788,702 | B1 | 9/2004 | Garcia-Luna-Aceves et al. |
| 6,791,997 | B2 | 9/2004 | Beyer et al. |
| 8,942,078 | B2 * | 1/2015 | Hashimoto ............. H04L 27/34 370/203 |
| 10,349,427 | B2 | 7/2019 | Aijaz |
| 10,952,032 | B2 * | 3/2021 | Raza ..................... H04L 1/1867 |
| 2007/0133455 | A1 | 6/2007 | Kuchibhotla et al. |
| 2008/0209301 | A1 | 8/2008 | Chang et al. |

(Continued)

FOREIGN PATENT DOCUMENTS

| EP | 1049272 B1 * | 6/2006 | ......... H04B 10/0791 |
| EP | 2129070 A1 * | 12/2009 | ............. H04L 27/34 |

(Continued)

OTHER PUBLICATIONS

Ferrari et al.: Efficient Network Flooding and Time Synchronization with Glossy; IEEE Explore; Apr. 2011.*

(Continued)

*Primary Examiner* — Jay P Patel
(74) *Attorney, Agent, or Firm* — Oblon, McClelland, Maier & Neustadt, L.L.P.

(57) ABSTRACT

A method of transmitting packets between a plurality of nodes of a network. The method comprising in each of a plurality of data timeslots, transmitting a data packet with one of the plurality of nodes and listening to receive the data packet with the remainder of the plurality of nodes. The method further comprising in each of one or more parity timeslots following the plurality of data timeslots, transmitting a parity packet with one or more of the plurality of nodes and listening to receive the parity packet with the remainder of the plurality of nodes. Each parity packet is derived from a set of the data packets transmitted during the plurality of data timeslots.

22 Claims, 7 Drawing Sheets

(56) References Cited

U.S. PATENT DOCUMENTS

| | | | |
|---|---|---|---|
| 2009/0040985 A1 | 2/2009 | Barnawi et al. | |
| 2009/0052429 A1 | 2/2009 | Pratt, Jr. et al. | |
| 2009/0067533 A1 | 3/2009 | Yuan et al. | |
| 2010/0166008 A1* | 7/2010 | Hashimoto | H04L 27/38 370/458 |
| 2011/0110345 A1 | 5/2011 | Heidari et al. | |
| 2013/0016600 A1 | 1/2013 | Hwang et al. | |
| 2013/0077555 A1 | 3/2013 | Gao et al. | |
| 2013/0279540 A1* | 10/2013 | Hui | H04W 72/1289 375/133 |
| 2014/0241254 A1 | 8/2014 | Kaur et al. | |
| 2015/0049644 A1 | 2/2015 | Lee | |
| 2015/0109926 A1 | 4/2015 | Jin et al. | |
| 2015/0351084 A1* | 12/2015 | Werb | H04L 63/12 370/329 |
| 2016/0021006 A1 | 1/2016 | Vasseur et al. | |
| 2016/0021011 A1 | 1/2016 | Vasseur et al. | |
| 2016/0044733 A1 | 2/2016 | Soriaga et al. | |
| 2016/0269096 A1 | 9/2016 | Thubert et al. | |
| 2016/0302195 A1* | 10/2016 | Zhang | H04W 72/0446 |
| 2018/0302908 A1 | 10/2018 | Aijaz | |
| 2019/0149957 A1* | 5/2019 | Raza | H04W 4/06 370/312 |
| 2019/0159022 A1* | 5/2019 | Skillermark | H04W 4/80 |
| 2021/0184793 A1* | 6/2021 | Andersson | H04L 1/0083 |

FOREIGN PATENT DOCUMENTS

| | | | | |
|---|---|---|---|---|
| EP | 2169858 A2 * | 3/2010 | | H04J 3/0623 |
| EP | 3563503 B1 * | 3/2021 | | H04L 1/00 |
| JP | 2008-270854 A | 11/2008 | | |
| JP | 2009-188924 A | 8/2009 | | |
| JP | 2010-263297 A | 11/2010 | | |
| JP | 2013-534120 A | 8/2013 | | |
| JP | 2013-176118 A | 9/2013 | | |
| JP | 2015-233351 A | 12/2015 | | |

OTHER PUBLICATIONS

Notification of Reasons for Refusal issued by the Japanese Patent Office dated Feb. 19, 2019, for Japanese Patent Application No. 2018-022046, 5 pages.

Federico Ferrari, et al., "Efficient Network Flooding and Time Synchronization with Glossy", Proceedings of the 10$^{th}$ ACM/IEEE International Conference on Information Processing in Sensor Networks, 2011, 12 pages.

Federico Ferrari, et al., "Low-Power Wireless Bus", Proceedings of the 10$^{th}$ ACM Conference on Embedded Network Sensor Systems, 2012, 15 pages.

Guangyu Fan, et al., "Extended Abstract: A Bi-directional TDMA Protocol for Underwater Acoustic Sensor Networks", ACM Int. Conf. Underwater Networks and Systems, 2013, 2 pages.

Vasuki Narasimha Swamy, et al., "Cooperative Communications for High Reliability Low-Latency Wireless Control," in Proc. IEEE Int. Conf. Communications (ICC), Jun. 2015, 7 pages.

Guntram Scheible, et al., "Unplugged but Connected: Design of a Truly Wireless Real-Time Sensor/Actuator Interface", IEEE Industrial Electronics Magazine, vol. 1, No. 2, 2007, pp. 25-34.

Nicola Accettura, et al., "Decentralized Traffic Aware Scheduling in 6TiSCH Networks: Design and Experimental Evaluation", IEEE Internet of Things Journal, vol. 2, No. 6, Dec. 2015, 17 pages.

Simon Duquennoy, et al., "Orchestra: Robust Mesh Networks Through Autonomously Scheduled TSCH", Proc. Int. Conf. Embedded Netw. Sensor Syst., Nov. 2015, 14 pages.

Ridha Soua, et al., "Wave: a distributed scheduling algorithm for convergecast in IEEE 802.15.4e TSCH networks", Transactions on Emerging Telecommunications Technologies, vol. 27, No. 4, 2016, pp. 557-575.

A.Morell, et al., "Label switching over IEEE802.15.4e networks", Transactions on Emerging Telecommunications Technologies, vol. 24, No. 5, 2013, pp. 458-475.

* cited by examiner

COMMUNICATION BETWEEN NETWORK NODES

FIELD

Embodiments described herein relate to methods of communicating between nodes of a network, and to networks and nodes configured use such methods.

BACKGROUND

Flooding is a method of routing packets to every node of a computer network. In existing flooding routing algorithms, nodes receiving packets may retransmit those packages via each of their network links other than the network links via which the packets were transmitted to the nodes.

Efficient Network Flooding and Time Synchronization with Glossy (Ferrari, Federico et al. Proceedings of the 10$^{th}$ ACM/IEEE International Conference on Information Processing in Sensor Networks. IEEE, 2011) presents a flooding architecture known as GLOSSY for facilitating rapid flooding in wireless networks, in which packet loss is common. When performing GLOSSY in a wireless network, nodes receiving a packet retransmit the packet either immediately or at a fixed time after its receipt. As neighbouring nodes receive wirelessly transmitted packets at approximately the same time, they will retransmit the packet at approximately the same time; their retransmissions will therefore interfere constructively, rather than destructively. This reduces the chance of packet loss during retransmissions. Nodes continue to retransmit the packet each time they receive a copy either until they have performed a pre-set number of transmissions, or until a pre-set time has elapsed since the initiation of the flood. The time since the flood was initiated is estimated using a relay counter bit in the packet, which is incremented with each retransmission, and an estimated time between subsequent transmissions.

Low-Power Wireless Bus (Ferrari, Federico et al. Proceedings of the 10$^{th}$ ACM Conference on Embedded Network Sensor Systems. ACM, 2012) presents a wireless communication protocol in which all traffic demands are mapped onto floods performed using GLOSSY. The nodes of the wireless network are time synchronized and are only allowed to initiate floods in time periods assigned to them by a central dedicated host node which computes a communication schedule, thereby avoiding collisions between floods initiated by different nodes.

Arrangements of the embodiments will be understood and appreciated fully from the following detailed description, made by way of example only and taken in conjunction with the drawings in which:

FIG. 6b is a timeline of a schedule of a communication time period of the network of FIG. 7a.

DETAILED DESCRIPTION

Figure 1A:
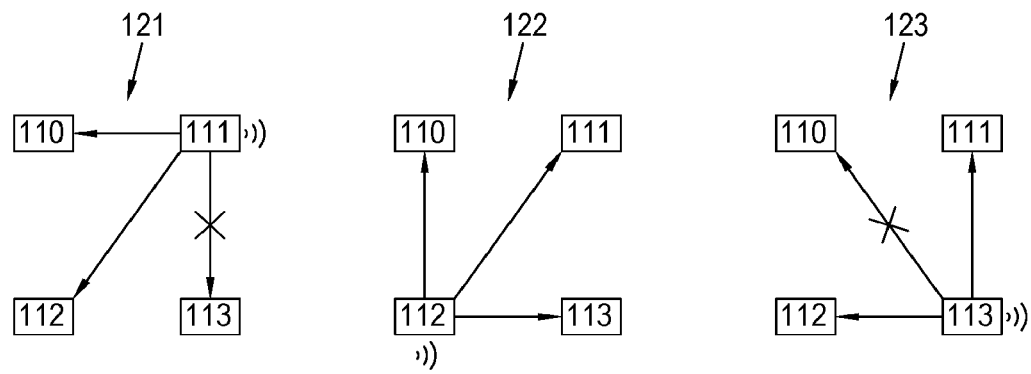
FIG. 1a shows diagrammatic views of a network during three data timeslots of a communication superframe.

According to an embodiment there is provided a method of transmitting packets between a plurality of nodes of a network, the method comprising: in each of a plurality of data timeslots, transmitting a data packet with one of the plurality of nodes and listening to receive the data packet with the remainder of the plurality of nodes; and in each of one or more parity timeslots following the plurality of data timeslots, transmitting a parity packet with one or more of the plurality of nodes and listening to receive the parity packet with the remainder of the plurality of nodes, wherein each parity packet is derived from a set of one or more of the data packets transmitted during the plurality of data timeslots.

The method may advantageously provide a rapid method of communicating information from one or more origin nodes to all other nodes in the network. The method may reduce the chance of packet loss by transmitting parity packets derived from the transmitted data packets, which may allow nodes to obtain packets that they did not successfully receive during the data timeslots.

The method may be used in situations in which flooding information from one or more source nodes to all of the nodes in a network is desired. Alternatively, or additionally, the method may be used in situations in which it is desired to transfer information from one or more source nodes to a single destination node (such as a controller node). In such embodiments, the information being received by nodes other than the destination node may be not be a necessary desired outcome of the communication but may increase the likelihood of the information being successfully received by the destination node by allowing the non-destination nodes to derive and transmit parity packets.

The network may be a single hop network. Single hop networks are networks consisting of nodes that each communicate directly with each other rather than relaying communications to each other via one or more intermediate nodes.

The network may be a shared medium network, in which all of the nodes of the network communicate with each other via a shared medium. In preferred embodiments, the network is a wireless network. For example, the network may comprise or consist of a plurality of nodes, which communicate with each other via radio-wave technologies such as Wi-Fi®, Bluetooth®, LoRa® and/or ultra-wideband. In embodiments where the network is a wireless network, the plurality of nodes of the network may be distributed.

Each of the plurality of nodes is preferably configured to communicate with, and preferably to transmit to and received transmissions from, each other node of the plurality of nodes. For example, each of the nodes may be configured to wirelessly transmit communications and to receive communications transmitted wirelessly by the remainder of the plurality of nodes. In such embodiments, each node will be able to transmit to, and receive transmissions from, each other node of the network, provided that the nodes are not out of range for, or obstructed from, transmitting to each other.

In some embodiments, the plurality of nodes may consist of one or more controller nodes and one or more non-controller nodes. In some embodiments, the network may comprise a single controller node, and/or may comprise a plurality of non-controller nodes. The non-controller nodes may be configured to transmit information to each other and to the controller node, and the controller node may be configured to transmit instructions, such as transmission timeslot scheduling instructions to the non-controller nodes.

In some embodiments, the network may be a network of a battery management unit (BMU) or battery management system (BMS). Such a network may comprise one or more controller nodes and a plurality of non-controller nodes as described above.

Some or each of the non-controller nodes of a BMU network may be, may be associated with, and/or may transmit communications from and receive communications for a cell management unit (CMU). A cell management unit may be or may comprise means for monitoring one or more cells, for example means for measuring the temperature, voltage, and/or other parameters of one or more cells. In some such embodiments, cell management units may be configured to control the one or more cells that they monitor, for example, in response to instructions distributed from the one or more controller nodes.

The one or more controller nodes of a BMU network may transmit instructions to the plurality of non-controller nodes (which are or are associated with the cell management units). These instructions may include instructions for scheduling transmissions by the nodes in different timeslots, requests for information, and/or commands to initiate processes such as providing top-up charging to individual cells in order to equalise the charge between different cells of the battery.

Battery management units may require regular communication from the cell management units to one of the one or more controller nodes (or other central control or management means), for example, to regularly report the voltage and current of each of the cells of the battery comprising the battery management unit. The battery management unit may also require regular communication from the one or more controller nodes (or other central control or management means) to each of the cell management units. In some battery management units it is necessary to regularly and/or frequently transmit communications from each of the cell management units to one of the one or more controller nodes (or other central control or management means) within a single communication cycle having a fixed time period, for example between 100 and 150 milliseconds.

In typical battery management units, cell management units associated with cells are connected to controller or management units via physical or wired connections in star, extended star, or ring network topologies. Wireless communications within a battery management unit typically have a low reliability due to obstructed lines of sight and the high reflectivity of metallic battery enclosures.

For example, a battery management unit may comprise a plurality of cell management units (for example, between 56 and 300 CMUs) associated with a controller and may require all of the cell management units to transmit data to (and potentially to receive data from) the controller within a short time budget (for example, between 100 and 150 milliseconds). The battery management unit may be designed to operate for an extended lifetime (for example, 10 years), and therefore the reliability with which the controller receives data packets from each cell management unit may need to be high (for example, the BMU may require a 99.9% probability of CMU data packets being successfully transmitting to the controller unit).

However, the probability of any individual wireless transmission being successfully received within a wireless network of a BMU may be relatively low (for example, between 63 and 68%). Transmission reliability in wireless networks is typically increased in battery management units by repeating transmissions, however this would require increasing the time budget and by extension the latency of the information exchange. Embodiments described herein provide high reliability bidirectional communication between nodes of a single hop shared medium network within short fixed time budgets.

For example, the method may be used to transmit one or more data packets from each of the cell management units of a battery management unit to all other nodes of a network, including a controller node. One cell management unit (or node associated therewith) may transmit a data packet in each data timeslot. Subsequently, one or more nodes may transmit parity packets derived from sets of the data packets in each of the one or more parity timeslots, thereby increasing the probability of the controller node becoming aware of the contents of all of the data packets without requiring repetition of data packet transmissions.

In shared medium networks, in which each of the nodes communicates via a shared medium, multiple separate communications cannot reliably be transmitted simultaneously via the shared medium. For example, in wireless networks, multiple wireless communications of the same frequency transmitted simultaneously by different nodes will interfere with each other. In such networks channel access methods such as frequency-division multiple access (FDMA) schemes or time-division multiple access (TDMA) schemes are used to facilitate communication between nodes.

Time-division multiple access is a channel access method in which a communication time period is divided into a plurality of different timeslots and nodes are assigned one or more of the timeslots in which to transmit while other nodes listen. Different nodes may therefore be assigned, and transmit within, different timeslots, such that their communications do not interfere with each other.

The method is preferably performed using a TDMA scheme. For example, in preferred embodiments, the plurality of data timeslots and the one or more parity timeslots are comprised by a communication cycle time period referred to as a superframe. The superframe preferably being divided into a plurality of timeslots.

The plurality of timeslots into which the superframe is divided preferably comprise the plurality of data timeslots in which a data packet is transmitted from one of the plurality of nodes and the one or more parity timeslots in which a parity packet is transmitted by one or more of the plurality of nodes.

The plurality of timeslots into which the superframe is divided may further comprise one or more additional data timeslots in which no data packet is transmitted. For example, the plurality of timeslots of the superframe may comprise a plurality of data timeslots for data packet transmission during some or all of which data packets are transmitted.

In some embodiments, the plurality of timeslots may comprise a plurality of data timeslots, each of which may be assigned to one of the plurality of nodes of the network (for example according to a schedule, which may be generated and/or distributed by a controller node). In some such embodiments, in each of these data timeslots, the node to which that timeslot is assigned transmits a data packet. In other such embodiments, in each of these data timeslot, the node to which that timeslot is assigned may either transmit a data packet or not (for example, depending on whether it has any data to share and/or whether it successfully received the schedule assigning it to the timeslot). In either implementation of such embodiments, some, or preferably all, of the nodes not assigned to the data timeslot may listen to receive any such transmission.

The plurality of timeslots into which the superframe is divided may further comprise one or more other timeslots in addition to the data timeslots and one or more parity timeslots. For example, the plurality of timeslots may comprise controller timeslots for distributing controller data packets to non-controller nodes. Such controller timeslots may occur before the data timeslots and controller data packets distributed therein may include a schedule for subsequent timeslots of the superframe. Controller timeslots are described in more detail later in the description.

In preferred embodiments, controller timeslots may comprise one or more controller data timeslots in which controller data packets are transmitted by a controller node and the remainder of the nodes listen to receive the controller node. The controller timeslots may further comprise one or more controller parity timeslots in which nodes transmit controller parity packets derived from sets of one or more of the controller data packets. Such controller parity timeslots may be synchronous controller parity timeslots in which a plurality of nodes simultaneously transmit controller parity packets.

Such controller parity timeslots may increase the likelihood that all of the non-controller nodes become aware of the contents of the controller data packets, which may include a schedule for some or all of the subsequent timeslots and/or a coding scheme determining the manner in which the one or more parity packets are derived from the transmitted data packets.

One, some or all of the plurality of timeslots into which the superframe is divided may be assigned to one or more nodes. In some embodiments, each of the plurality of timeslots is assigned to one or more nodes. Which node is assigned to one, some or all of the timeslots may be pre-set. Alternatively, or additionally, which node is assigned to one, some, or all of the timeslots may be determined dynamically and/or distributed via a schedule.

In preferred such embodiments, each of the data timeslots is assigned to one node and/or each of the one or more parity timeslots is assigned to one or more nodes. In some embodiments, the one or more parity timeslots may comprise one or more synchronous parity timeslots, which may each be assigned multiple nodes, or to all of the plurality of nodes of the network. Alternatively or additionally, the one or more parity timeslots may comprise one or more single transmitter parity timeslots, which may each be assigned to a single node.

In some embodiments, in each timeslot, the one or more nodes assigned to that timeslot may or may not transmit. For example, nodes may not transmit if they are unaware that they have been assigned to that timeslot (for example, as a consequence of not successfully receiving a schedule). In some embodiments, in each of the data timeslots, the node assigned to that data timeslot may transmit a data packet. In alternative embodiments, in some or all of the data timeslots, assigned nodes may transmit only if they have data to be transmitted. In preferred embodiments, in each of the parity timeslots, assigned nodes may only transmit if they have received or derived all the data packets necessary to derive and transmit a suitable parity packet. In preferred embodiments, in each timeslot, nodes assigned to a timeslot that do not transmit therein, and/or that are not assigned to the timeslot, preferably listen to receive any transmission by any assigned transmitting nodes.

In some embodiments, each of the data timeslots is assigned to one node of the network (preferably to one non-controller node of the network), which must transmit a data packet within that data timeslot. In some such embodiments, each node of the network, or each non-controller node of the network, may be assigned at least one of the data timeslots. In such embodiments, a node failing to, or otherwise being unable to, reliably transmit data packets to other nodes may be recognised, for example by a controller node not receiving, or not being able to derive using received parity packets, more than a threshold number or fraction of data packets transmitted by that node.

In some embodiments, consecutive timeslots of the plurality of timeslots are not separated by time gaps. Alternatively, there may be time gaps between subsequent timeslots. As the clocks of each node of the network may not be perfectly synchronized different nodes may perform their actions within the same timeslot over different spans of time, which may not perfectly overlap. Method of ensuring suitable levels of time synchronization between clocks of the nodes are described later in the description.

The plurality of timeslots into which the superframe is divided may be of equal duration or substantially equal duration. The duration of a slot may be long enough to transmit a single packet of a pre-determined data size. If information to be transmitted exceeds this data size it may be divided into multiple packets, which may be transmitted during different timeslots and/or different iterations of the steps of the method. Alternatively, different timeslots may have different durations, for example, data timeslots may be of different durations to parity timeslots.

The number, duration, order, schedule and/or distribution of timeslots into which the superframe is divided may be partially or entirely pre-set. For example, the superframe may be divided into a pre-set number of consecutive timeslots, the timeslot having equal durations and no time gaps between them.

Alternatively, or additionally, the superframe, or one or more portions thereof, may be divided into timeslots dynamically. The superframe or portions thereof may be divided into timeslots dynamically before, at the beginning of, or during that superframe, may be divided into timeslots dynamically in dependence upon one or more parameters or stimuli, and/or may be divided into timeslots dynamically by a controller node or a system in communication therewith.

For example, a first portion of a superframe may be divided into one or more pre-set controller timeslots (which may be divided into controller data timeslots and controller parity timeslots) and the remainder of the superframe may be dynamically divided into additional timeslots. In such embodiments, a schedule of these additional timeslots may be distributed from a controller node to the non-controller nodes of the network in controller data packets distributed during the one or more pre-set controller timeslots, thereby informing the non-controller nodes of the manner in which the superframe is divided into timeslots.

If multiple superframes are performed using the method and/or by a network operating according to the method, each superframe may be divided into an identical pre-set series of timeslots. Alternatively, different superframes may be divided into different pre-set series of timeslots. In other embodiments, at least part of one or more of the superframes may by dynamically divided into timeslots as described above.

In embodiments wherein a superframe is divided into one or more pre-set timeslots, whether each of one, some, or all of the timeslots are data timeslots, parity timeslots, and/or controller timeslots may be pre-set. In such embodiments, whether each, of one, some or all of any pre-set parity timeslots are synchronous parity timeslots and/or single transmitter parity timeslots may be pre-set.

For example, a superframe may be divided into a pre-set number of controller timeslots, followed by a pre-set number of data timeslots, followed by a pre-set number of parity timeslots. The number of controller timeslots may be sufficient for a timeslot allocation schedule to be reliably distributed from a controller node to all non-controller nodes, the number of data timeslots may be equal to the number of non-controller nodes, and the number of parity timeslots may be sufficient to reduce the probability of packet loss to a desired threshold level. The parity timeslots may be divided into a pre-set number of single transmitter parity timeslots followed by a pre-set number of single transmitter parity timeslots.

Alternatively, or additionally, some or all of the plurality of timeslots into which the superframe is divided (either in a pre-set manner or dynamically) may be dynamically designated as data timeslots, parity timeslots, and/or controller timeslots (and/or as controller data timeslots, controller parity timeslots, synchronous parity timeslots, and/or single transmitter parity timeslots). The dynamically designated timeslots may be designated before, at the beginning of, or during the superframe, may be designated in dependence upon one or more parameters or stimuli, and/or may be designated by a controller node or a system in communication therewith.

For example, a superframe may be divided into pre-set series of timeslots, a first portion of which may be pre-designated as controller timeslots (and/or as controller data timeslots and/or controller parity timeslots) and the remainder of which may be dynamically designated as data timeslots, synchronous parity timeslots, and/or single transmitter parity timeslots. A schedule of these dynamically designated timeslots may then be distributed to the nodes of the network during the pre-set controller timeslots, thereby allowing the nodes to perform the appropriate actions during the dynamically designated timeslots.

If multiple superframes are performed using the method and or the network, each superframe may be divided into an identical pre-set series of timeslots which may be identically designated as control, data, parity, synchronous parity and/or single transmitter parity timeslots in a pre-set matter. Alternatively, the timeslots of different superframes may be designated in different manner and/or may be at least partially designated dynamically.

In some embodiments, which node or nodes are assigned to each timeslot may be pre-set. For example, in embodiments wherein a superframe is divided into a plurality of pre-set data timeslots and/or one or more pre-set single transmitter parity timeslots, which node is assigned to each data timeslot and/or single transmitter parity timeslot may be pre-set.

A superframe may be divided into a pre-set series of timeslots comprising synchronous parity timeslots, single transmitter parity timeslots and a number of data nodes equal to the number of non-controller nodes of the network (or to the number of non-controller nodes communicating using a single channel of the network on which the method is performed). Each data timeslot may be assigned to a different pre-set node and each single transmitter parity timeslot may be assigned to a pre-set node. All of the nodes may be assigned to the synchronous parity timeslots, such that any node may simultaneously transmit a parity packet during that timeslot if it has received or derived the data packets from which the parity packet is to be derived.

In alternative embodiments, nodes may be assigned to one, some or all of the timeslots dynamically. In preferred embodiments, nodes are assigned dynamically to each data timeslot and/or to each single transmitter parity timeslot. Nodes may be assigned to timeslots dynamically before, at the beginning of, or during a superframe, may be assigned to timeslots in dependence upon one or more parameters or stimuli, and/or may be assigned to timeslots by a controller node or a system in communication therewith.

The manner in which one or more portions of the superframe are divided into timeslots; whether one or more timeslots are controller timeslots, controller data timeslots, controller parity timeslots, data timeslots, parity timeslots, synchronous parity timeslots, and/or single transmitter parity timeslots; and/or which node is associated with, and/or transmits within, one or more of the timeslots may be distributed in a schedule. Such a schedule may be distributed from a controller node, may be distributed in one or more controller data packets, and/or may be distributed during one or more controller timeslots.

For example, a controller node may distribute a schedule including: the timings of timeslots into which the superframe is divided; the designation of each timeslot (controller data timeslot, controller parity timeslot, data timeslot, synchronous parity timeslot, single transmitter parity timeslot etc.); the node or nodes assigned to each timeslot, and/or the manner in which parity packets to be transmitted during parity timeslots are to be derived (for example, the set of data packets from which the parity packet to be transmitted during a parity timeslot is derived, the formula by which it is to be derived, and/or the coding scheme by which parity packets are to be derived). The schedule may determine, or influence the behaviour of each non-controller node of the network during the timeslots.

Whether or not a node transmits a packet within, and/or is assigned to, a specific timeslot may be dependent upon instructions received by that node, such as a schedule as described above.

The method comprises, in each of a plurality of data timeslots transmitting a data packet with one of the plurality of nodes. Different data packets with different contents may be transmitted in different data timeslots and/or different nodes may transmit data packets in different data timeslots.

The method comprises, in each of the one or more parity timeslots, transmitting a parity packet with one or more of the plurality of nodes; wherein each of the one or more parity packets is derived from a set of one or more of the data packets transmitted during the plurality of data timeslots.

In preferred embodiments, each of the one or more parity packets is derived from a set of a plurality of the data packets. In some embodiments, the set of data packets that one, some, or all of the parity packets are derived from may be all of the data packets transmitted during the data timeslots.

In some embodiments, the one or more parity timeslots may be a plurality of parity timeslots. In such embodiments a plurality of parity packets are preferably transmitted in the plurality of timeslots. Some or all of the parity packets may be different from each other, having different contents and/or being derived from different sets of data packets and/or from different portions (such as bits). Alternatively, or additionally, different nodes or groups of one or more nodes may transmit parity packets in different parity timeslots.

In some embodiments, the plurality of data packets that are transmitted (and/or which were scheduled to be transmitted) during the plurality of data timeslots may be divided into a plurality of groups. Each of the groups preferably comprises one or more of the sets of data packets from which the parity packets are derived. Therefore at least one parity packet is derived from data packets comprised by each of the sets. In some such embodiments, each of the groups may comprise a plurality of different sets of data packets from which different parity packets are derived.

In some embodiments, one, some or all of the groups comprise a set of data packets from which a parity packet is derived (and/or is scheduled to be derived) that consists of all of the data packets comprised by that group. Alternatively, or additionally, one, some, or all of the groups comprise one or more sets of data packets from which parity packets are derived (and/or are scheduled to be derived) that consist of a subset of the data packets comprised by that group. One, some, or all of the groups may be superset of one or more of the sets from which parity packets are derived (and/or are scheduled to be derived).

In preferred embodiments in which the data packets are divided into multiple groups, none of the data packets are shared between different groups, and/or none of the sets of data packets from which parity packets are derived comprise data packets from multiple different groups.

The plurality of data timeslots and/or the plurality of nodes may be considered to be grouped in the same manner as the data packets transmitted therein and/or thereby, and/pr scheduled to be transmitted therein and/or thereby. However, parity packets derived from sets of data packets transmitted by a group of nodes during the data timeslots may be derived and transmitted by nodes outside of that group during the parity timeslots.

One or more parity packets may be derived from each of the sets of data packets. Multiple parity packets derived from the same set of data packets may be the same or different from each other.

In some embodiments, the set of data packets from which one, some, or all of the one or more parity packets are derived may be a single data packet. In such embodiments, the parity packet derived from that set may be a repetition or retransmission of the data packet. In preferred embodiments set of data packets from which one, some, or all of the one or more parity packets are derived each comprise multiple parity packets.

One, some, or each of the one or more parity packets may configured such that each data packet, or parts thereof, of the set of data packets from which the parity packet was derived, is able to be calculated from that parity packet and the remainder of the set of data packets.

Therefore, a node which does not successfully receive one or more of the data packets transmitted during the data timeslots but which does successfully receive one or more parity packets derived from the data packets received by the node as well as other data packets that the node did successfully receive, may calculate the missing data packet that it did not successfully receive.

In some embodiments, one or more parity packets may be derived from one or more sets of data packets comprised by the same group of K data packets. In such embodiments, the parity packets may be configured such that any of the group of data packets are derivable from any K packets out of the group of data packets and the one or more parity packets derived therefrom. Such parity packets may be derived from one or more sets of data packets comprised by each of some or all of a plurality of groups of data packets into which the parity packets are divided as described above.

In preferred embodiments, one, some, or all of the parity packets may each be derived from a set of a plurality of data packets using an erasure coding scheme. For example, an erasure coding scheme may be for transforming a message of k symbols (data packets or elements thereof) into n symbols preferably comprising the original k symbols and n-k additional parity or redundancy symbols (parity packets or elements thereof). Such an erasure coding scheme has a code rate r=k/n.

The k symbols may be k data packets defining a group as described above and the n symbols may be n packets consisting of the k data packets and n-k parity packets derived from sets of data packets comprised by the group of k data packets.

The erasure coding scheme with which one, some or all of the parity packets are derived is preferably an optimal erasure coding scheme such that any of the n symbols are recoverable from any k of the n symbols. The erasure coding may use maximum distance separable codes such as Reed Solomon codes.

Alternatively or additionally, the erasure coding scheme with which one, some or all of the parity packets are derived may be a non-optimal erasure coding scheme. In non-optimal erasure coding schemes, any of the n symbols is not necessarily recoverable from any k of the symbols. However, non-optimal coding schemes may allow the k symbols to be a superset of data packets including multiple different sets of data packets from which different parity packets may be derived, without requiring a node deriving a parity packet to have knowledge of all parity packets of the superset.

Each parity packet, and/or the set of parity packets from which the parity packet is derived, may be associated with a parity timeslot. The set of data packets associated with a parity timeslot may be the data packets transmitted during a set of data timeslots associated with that parity timeslot.

The set of data packets from which one, some, or all of the parity packets are derived, and/or the method, formula, and/or coding scheme by which they are derived may be pre-set and/or may be selected dynamically. For example, which of the plurality of data timeslots a parity timeslot is associated with may be pre-set or determined dynamically (such that a node assigned to transmit during that parity timeslot will derive and transmit a parity packet from the set of data packets transmitted during those data timeslots if it is aware of their contents due to having transmitted them, successfully received them or derived them from one or more previous parity packets). In some embodiments, which of a plurality of pre-set methods or formulae for deriving a parity packet from a set of data packets is used during a parity timeslot may be selected dynamically.

In embodiments in which the sets of data packets and/or the methods or formulae from which one, some, or all of the parity packets are derived are determined dynamically, they may be distributed to non-controller nodes of the network from a controller node. Such information may be distributed as part of, or along with a schedule of timeslots as described above, may be distributed within one or more controller data packets and/or may be distributed during one or more controller timeslots.

In some embodiments, the method may comprise, in one or more of the parity timeslots, simultaneously transmitting a parity packet associated with that timeslot with two or more of the plurality of nodes and listening to receive the parity packet with the remainder of the plurality of nodes. These parity timeslots are referred to as synchronous parity timeslots.

In embodiments wherein the nodes communicate wirelessly, simultaneous transmissions of the same packets constructively interfere, increasing the chance that they are successfully received by other nodes. Additionally, the synchronously transmitted parity packets are transmitted from a larger number of nodes, which may be spread out spatially, increasing the likelihood that listening nodes will be proximate to a transmitting node and able to receive a parity packet.

The plurality of nodes which simultaneously transmit the same parity packet in each synchronous parity timeslot are preferably all the nodes which have transmitted, successfully received, and/or derived using a previously transmitted parity packet, each of the set of data packets from which that parity packet is to be derived.

In preferred embodiments, the one or more parity timeslots comprises one or more synchronous parity timeslots and the method comprises, during each of the synchronous parity timeslots, each node which has previously transmitted, successfully received, and/or derived using a previously transmitted parity packet each of the set of data packets from which that parity packet is to be derived.

In such embodiments, during each synchronous parity timeslot, every node which knows all of the set of data packets associated with that parity timeslot (either by being the original transmitter of a data packet, having successfully received the data packet when it was transmitted during its data timeslot, or having previously derived the data packet using an earlier parity timeslot derived therefrom) transmits a parity packet derived from that set of data packets while all of the nodes which do not know the entirety of the set of data packets listen to receive it. The multiple simultaneous transmissions of the parity packet constructively interfere which may allow those nodes with unreliable connections to other nodes to successfully receive the parity packet, which they may use to derive data packets that they did not successfully receive during the data timeslots.

The one or more parity timeslots may be a plurality of parity timeslots and may comprise a plurality of synchronous parity timeslots.

Synchronous parity timeslots advantageously do not require scheduling of specific nodes as transmitters or receivers.

In some embodiments, the method may comprise, in one or more of the one or a plurality of parity timeslots, transmitting a parity packet with one of the plurality of nodes and listening to receive the parity packet with the remainder of the plurality of nodes. These timeslots are referred to as single transmitter parity timeslots.

In some embodiments, one of the plurality of nodes may be assigned to each of the one or more single transmitter parity timeslots. In such embodiments, the method may comprise, in each of the one or more single transmitter parity timeslots, transmitting a parity packet with the node assigned to that single transmitter parity timeslot if that node has previously transmitted, successfully received, and/or derived using a previously transmitted parity packet, each of the set of data packets from which that parity packet is to be derived. The method may further comprise listening to receive the parity packet with the remainder of the plurality of nodes, or with the all other nodes which have not previously transmitted, successfully received, and/or derived using a previously transmitted parity packet, each of the set of data packets from which that parity packet is to be derived, or all of the data packets transmitted during the plurality of data timeslots.

The one or more single transmitter parity timeslots may be a plurality of single transmitter parity timeslots. In some such embodiments, different nodes may be assigned to different single transmitter parity timeslots and/or different nodes may transmit parity packets during different single transmitter parity timeslots. Alternatively, the same node may be assigned to each single transmitter parity timeslot and/or the same node may transmit parity packets during each single transmitter parity timeslot.

As described above, which of the plurality of nodes is assigned to and/or transmits within one, some, or each of the one or more single transmitter parity timeslots may be determined and/or assigned dynamically, for example, before, at the beginning of, or during the superframe. A node may be assigned to each single transmitter parity timeslot in dependence upon one or more parameters or stimuli, and/or may be assigned to timeslots by a controller node or a system in communication therewith.

In preferred such embodiments, a node is selected and/or assigned in order to maximise the probability of a parity packet being received by a controller node of the network during that single transmitter parity timeslot.

In some embodiments, which node is assigned to and/or transmits a parity packet during each single transmitter parity timeslot is dependent upon the probability of each of a plurality of nodes being aware of the contents of all of the set of data packets from which the parity packet of that timeslot is to be derived. The plurality of nodes may be all of the nodes, or all of the non-controller nodes of the network. A node may be aware of the contents of a data packet due to having transmitted that data packet, having successfully received that data packet, and/or having derived that data packet using one or more previously received parity packets.

Alternatively, or additionally, which node is assigned to and/or transmits a parity packet during each single transmitter parity timeslot is dependent upon the probability of each of a plurality of nodes being aware of the contents of all of the data packets transmitted during the plurality of data frames.

Alternatively, or additionally, which node is assigned to and/or transmits a parity packet during each single transmitter parity timeslot may be dependent upon the probability of each of a plurality of nodes successfully transmitting a parity packet to a controller node. The plurality of nodes may be all of the non-controller nodes of the network.

In preferred embodiments the plurality of nodes comprise a controller node and a plurality of non-controller nodes, and the node which transmits a parity packet during (and/or is assigned to) each single transmitter parity timeslot is selected in dependence upon: probabilities of each non-controller node successfully transmitting a parity packet to the controller node and/or probabilities of each non-controller node having transmitted, successfully received and/or derived using one or more previously received parity packets, all of a set of data packets from which the parity packet to be transmitted in that single transmitter parity timeslot is to be derived. In some such embodiments, the set of data packets from which the parity packet to be transmitted in that single transmitter parity timeslot is to be derived may be all of the data packets transmitted during the plurality of data frames.

In such embodiments, the selection of the node may give preference to non-controller nodes with greater products of probabilities of successfully transmitting a parity packet to the controller node and its probabilities of having transmitted, successfully received and/or derived from previously received parity packets, all of the set of data packet. For example the selected node may be the non-controller node with the greatest such product, or one of a plurality of non-controller node whose said product exceeds a threshold value.

The above-mentioned probabilities may be estimated, for example by the controller node. In preferred embodiments, the above-mentioned probabilities are estimated based on performance of each of the non-controller nodes in previous superframes in which the plurality of nodes communicated using the method.

In some embodiments, the estimated probability of a node being aware of the contents of all of the set of data packets from which the parity packet of a single transmitter parity timeslot is to be derived, may be, or may be estimated using, the fraction of a number of previous superframes in which the node was aware of the contents of all of the set of data packets from which the parity packets of one or more parity timeslots were to be derived. The one or more parity timeslots may be a plurality of timeslots, or may be a single timeslot, such as a single transmitter parity timeslot of the previous superframes corresponding to the single transmitter parity timeslot whose assigned and/or transmitted node is being determined dynamically.

Alternatively, or additionally, the fraction of a number of previous superframes in which the node was aware of the contents of all of the data packets transmitted during the data timeslots may be, or may be used to estimate, the estimated probability of a node being aware of the contents of all of the set of data packets from which the parity packet of a single transmitter parity timeslot is to be derived.

The number of superframes may be all preceding superframes, or may be a number of consecutive superframes preceding the current superframe.

Which packets a node was aware of the contents of during a previous superframe, or whether a node was aware of the contents of one or more sets of packets, may have been communicated to a controller node within a data packet transmitted by that node in that previous superframe, in another subsequent previous superframe, or in the superframe comprising the single transmitter parity timeslot whose associated or transmitting node is being dynamically assigned.

In some embodiments, the estimated probability of a non-controller node successfully transmitting a parity packet to a controller node may be, or may be estimated using, the fraction of a number of previous timeslots wherein the non-controller node transmitted a packet and the controller node listened to receive the transmitted packet in which the controller node successfully received the packet.

The previous timeslots, may be or may comprise previous data timeslots in which the node transmitted a data packet, and/or previous single transmitter parity timeslots assigned to the node. The controller node may be aware of the fraction from records of packets received from the node and of previous transmission schedules.

Which node is assigned to and/or transmits within each single transmitter parity timeslot may be determined by a schedule, which may be distributed from the controller node to all non-controller nodes, for example during one or more controller timeslots. Such a schedule may be created according to probabilities as described above.

In alternative embodiments, which of the plurality of nodes is assigned to and/or transmits within one, some, or each of the one or more single transmitter parity timeslots may be pre-set.

In preferred embodiments, the one or more parity timeslots are a plurality of parity timeslots and comprise one or more synchronous parity timeslots and one or more single transmitter parity timeslots. As described above the method may comprise, in each of the synchronous parity timeslots, simultaneously transmitting the same parity packet with two or more of the plurality of nodes and listening to receive the parity packet with the remainder of the plurality of nodes; and, in each of the single transmitter parity timeslots, transmitting a parity packet with one of the plurality of nodes and listening to receive the parity packet with the remainder of the plurality of nodes.

Alternatively, the method may comprise, during each of the synchronous parity timeslots, each node which has previously transmitted, successfully received, and/or derived using a previously transmitted parity packet all of the set of data packets from which that parity packet is to be derived, and during each of the single transmitter parity timeslots, transmitting a parity packet with the node assigned to that single transmitter parity timeslot if that node has previously transmitted, successfully received, and/or derived using a previously transmitted parity packet, all of the set of data packets from which that parity packet is to be derived. The method may further comprise, during each of the synchronous parity timeslots and single transmitter parity timeslots, listening to receive the parity packet with the remainder of the plurality of nodes, or with the all other nodes which have not previously transmitted, successfully received, and/or derived using a previously transmitted parity packets, all of the set of data packets from which that parity packet is to be derived, which may be all of the data packets transmitted during the plurality of data timeslots.

The one or more synchronous parity timeslots and/or single transmitter parity timeslots of embodiments comprising both synchronous and single transmitter parity timeslots may comprise any of the optional features described above with reference to embodiments comprising one or the other.

The one or more synchronous parity timeslots preferably occur before the one or more single transmitter parity timeslots.

In embodiments in which time synchronization between the nodes is performed during the data timeslots (and optionally during controller timeslots and/or controller data timeslots which may precede the data timeslots) but not during synchronous parity timeslots, it may be advantageous to perform the synchronous parity timeslots before the single transmitter parity timeslots. This may increase the synchronization of the clocks of the nodes during the synchronous parity timeslots, thereby allowing the synchronously transmitted parity packets to be transmitted with more precise timings and to ensure that they constructively rather than destructively interfere. Even in the event that the clocks of some or all of the nodes have drifted significantly with respect to each other by the time of the single transmitter parity timeslots, single transmitter parity packets will be able to be reliably transmitted parity packets due to the lack of interference from other nodes.

Additionally, performing the single transmitter parity timeslots after the synchronous parity timeslots allows the node assigned to transmit during a single transmitter parity timeslot to receive parity packets transmitted during the synchronous parity timeslots before the single transmitter parity timeslots. This increases the probability of that node being aware of the contents of all of the set of data packets from which the single transmitter parity packet is to be derived and therefore being able to derive and transmit the parity packet.

In order to ensure that all of the plurality of nodes of the network perform the correct actions during each timeslot, it is advantageous to synchronize the plurality of nodes (and/or the clocks thereof). This may ensure that durations and boundaries of superframes and/or timeslots thereof are timed consistently between nodes.

In preferred embodiments, the data packets are timestamped and are used to synchronize clocks of the nodes. For example, nodes which successfully receive a data packet may estimate the time since the data packet was originally transmitted and may use this estimation and a timestamp of the data packet (such as a timestamp of when the data packet was transmitted according to the clock of the node from which it was transmitted) to update their clocks. In such embodiments, each node that successfully receives the same data packet will update their clocks in substantially the same manner, the clocks of these nodes will therefore be substantially synchronised.

Alternatively, or preferably additionally, packets, such as controller data packets transmitted by a controller node during one or more controller data timeslots may be timestamped and may be used to synchronize clocks of the nodes. As described above, nodes that receive a timestamped packet may estimate the time since that packet was originally transmitted and may use this estimation and a timestamp of the packet to update their clocks.

In some embodiments, the number of synchronous parity timeslots may be determined such that the clocks of the nodes do not desynchronize over the course of the synchronous parity timeslots to the extent that transmitted synchronous parity packets are not received. For example, the accumulated clock drift over the number of synchronous parity timeslots may be selected such that the cumulative clock drift over their combined duration does not exceed 0.5 microseconds for IEEE 802.15.4 DSSS/OQPSK modulation. This maximum clock drift may differ for different wireless communication technologies.

Data packets and packets transmitted by a controller node are preferably transmitted by only a single node and listened for by all other nodes, this may allow all nodes to update their clocks substantially simultaneously in the same manner if they receive such a packet.

Parity packets transmitted during synchronous parity timeslots are preferably not used to synchronize node clocks. Such packets are transmitted simultaneously by multiple nodes, therefore different nodes listening for and successfully receiving such packets may receive packets that were originally transmitted by different nodes which could lead to the different receiving nodes updating their clocks differently.

Parity packets transmitted during single transmission parity timeslots are preferably not used to synchronize node clocks. Such timeslots are preferably after one or more synchronous parity timeslots, by which time the clocks of the plurality of nodes may not be synchronised, for example the nodes may comprise low power clock crystals whose clocks may drift.

In some embodiments, the plurality of nodes of the network comprise a controller node. In such embodiments, the method may comprise, in one or more controller timeslots, distributing one or more controller data packet from the controller node to the non-controller nodes. The one or more controller timeslots may be or may comprise one or more controller data timeslots.

In some embodiments, the plurality of nodes of the network comprise a controller node. In such embodiments, the method may comprise, in each of one or more controller data timeslots, transmitting a controller data packet with the controller node and listening to receive the controller data packet with the remainder of the nodes.

Controller data packets may contain schedule of the timeslots and/or other instructions for the non-controller nodes of the plurality of nodes. A schedule of the timeslots may comprise: the manner in which the superframe is divided into timeslots, the timing and/or duration of each of the timeslots, the designation of each of the timeslots, the one or more nodes assigned to and/or transmitting within each of the timeslots, the set of data slots associated with each of the parity timeslots and/or the means by which each of the parity packets is to be derived from an associated set of data packets.

In some embodiments, the one or more controller timeslots and/or the one or more controller data timeslots thereof may precede the plurality of data timeslots and which node of the plurality of nodes transmits a data packet in each of the plurality of data timeslots may be scheduled using the one or more controller data packets.

The one or more controller timeslots or controller data timeslots thereof may be the first timeslots of the superframe. This may allow the controller timeslots to be used to distribute instructions, such as a schedule, determining how the remainder of the superframe is to be performed. This allows the performance of the method, and/or the manner in which nodes of the network communicate to be varied between superframes. This may advantageously allow changes in network performance to be adapted to, for example by varying which nodes are assigned to single transmitter parity timeslots, or varying the number and/or relative frequency of synchronous and single transmitter parity timeslots. In some embodiments, the controller timeslots being used to distribute instructions for the performance of the remainder of the superframe may allow the controller to initiate an emergency mode in response to a large number of dropped packets from one or more non-controller nodes in preceding superframes.

In some embodiments, the controller timeslots may comprise one or more controller data timeslots and one or more controller parity timeslots, which may be intermediate the controller data timeslots and the data timeslots. The method may comprise, in each of the one or more controller parity timeslots, transmitting a controller parity packet with one or more of the plurality of nodes and listening to receive the controller parity packet with the remainder of the plurality of nodes, wherein each controller parity packet is derived from a set of one or more of the controller data packets.

In preferred embodiments, in each of the one or more controller parity timeslots, a plurality of nodes may simultaneously transmit a controller parity packet.

In some such embodiments, the one or more controller data timeslots may be a single controller data timeslot, and wherein the method comprises: in the each of one or more controller parity timeslots following the controller data timeslot, simultaneously transmitting the controller data packet (as a controller parity packet derived from that single data packet) with the controller node and with each other node that successfully received the controller data packet in the controller data timeslot or in a previous controller repetition timeslot, and listening to receive the controller data packet with the remainder of the nodes.

The retransmission of the single controller data packet as a parity packet may advantageously ensure that the controller data packet is distributed to all nodes of the network. In other embodiments, the one or more controller data timeslots may be a plurality of controller data timeslots, each followed by one or more controller parity timeslots, in which multiple nodes may simultaneously retransmit the controller data packet transmitted in the preceding controller data timeslot as described above.

In some embodiments, the one or more controller data timeslots may be a plurality of controller data timeslots and each controller parity packet may be derived from a set of multiple controller data packets. In such embodiments, the controller parity packet may be transmitted simultaneously by each node which is aware of the contents of all of the set of controller data packets from which that controller parity packet is to be derived.

In some embodiments, the one or more controller data timeslots are a plurality of controller data timeslots. In such embodiments, each controller parity packet is derived from a set of multiple controller data packets transmitted during the plurality of controller data timeslots.

The controller parity timeslots in which controller parity packets derived from controller data packets are transmitted preferably act in the same manner as synchronous parity timeslots described above in which parity packets derived from data packets are transmitted. The controller parity timeslots and controller parity packets thereof may comprise any suitable optional feature of the parity timeslots and parity packets described elsewhere in the description, with references to parity timeslots being replaced with controller parity timeslots and references to parity packets being replaced with controller parity packets. For example, one, some or all of the parity packets may be derived from sets of multiple controller data packets.

In some embodiments, the method may be performed for multiple superframes. Such multiple superframes may be separated or consecutive in time and may be performed in the same manner or with variations as described above. In some embodiments, the manner in which the method is performed may be responsive or dependent upon the outcome of the method or steps thereof during preceding superframes.

For example, in embodiments wherein the method is repeatedly performed in different superframes, the manner in which the method is performed in a given superframe may be dependent upon the packets received by a controller node of the plurality of nodes during one or more preceding superframes. In such embodiments, in which in each superframe each non-controller node is configured or assigned to transmit at least one data packet, the manner in which the method is performed in a given superframe may be dependent upon from which of the non-controller nodes a controller node received or derived using one or more parity packets a data packet during one or more preceding superframes.

For example if a controller node does not receive and is unable to derive a data packet from one or more non-controller nodes for a threshold number of superframes, one or more emergency superframes may be performed instead of normal operation superframes. For example, if a controller node does not receive and is unable to derive a data packet from one or more non-controller nodes for X superframes in a row, the subsequent Y superframes may be replaced with emergency superframes, wherein X+Y may be the maximum number of consecutive superframes tolerable by the network, method, or application thereof.

In some embodiments, if the method is performed and the controller node does not receive, and is unable to derive using a received parity packet, any data packet transmitted by one of the plurality of nodes, a count associated with that node is incremented. In such embodiments, if the count associated with one or more nodes exceeds a threshold before the controller data timeslots, only the one or more nodes with associated counts exceeding the threshold (or a second threshold) may be scheduled to transmit data packets in the plurality of data timeslots. In some such embodiments only, one or more nodes with associated counts exceeding the threshold (or a second threshold) may also be scheduled to transmit data packets in the plurality of data timeslots of one or more subsequent superframes. The count associated with one, some or all of the nodes assigned to the data slots may be reduced, for example to zero, after the one or more superframes are complete, and/or after the controller node successfully receives or derives a data packet transmitted by said nodes.

Such a method may provide an emergency mode or emergency superframe in response to a threshold number of superframes being performed without a controller node being able to successfully receive, or derive using a parity packet, a data packet from one or more non-controller nodes. Within the emergency mode or emergency superframe, all of the data timeslots are assigned to the nodes from which packets have previously not been received, thereby increasing the chances of the controller node successfully obtaining information from these nodes.

Within emergency superframes as described above, the plurality of data timeslots of the superframe may be divided evenly between the one or more nodes whose associated counts exceed the threshold or the second threshold (which may be lower than the threshold for triggering the performance of an emergency superframe). In preferred such embodiments, the data timeslots assigned to each node may be spaced apart in time to prevent all packets from a single node being lost due to interference persisting for a duration. For example, in embodiments where a superframe comprises S data timeslots and L nodes have counts exceeding the threshold or second threshold Parity slots, preferably including synchronous parity slots and/or single transmitter parity slots are preferably performed in emergency superframes as in other superframes described above.

In some embodiments, the method (and/or steps and timeslots thereof) may be performed simultaneously on multiple channels of a network. In such embodiments, a controller node capable of transmitting or receiving packets on multiple channels simultaneously on different channels (for example, as a consequence of comprising multiple transceivers) may communicate with multiple groups of non-controller nodes (which may only be capable of transmitting or receiving packets on a single channel at a time) on different channels. In such embodiments, in each timeslot, each non-controller node may transmit or listen to receive a node on a channel on which it operates, while the controller node may separately transmit or listen to receive packets on each of the plurality of channels.

According to further embodiments there is provided a network comprising a plurality of nodes, the network and/or the plurality of nodes thereof being configured to communicate using a method as described above.

According to further embodiments there is provided a method of operating a node of a network comprising a plurality nodes, the method comprising: in each of a plurality of data timeslots, transmitting or listening to receive a data packet associated with that data timeslot; and in each of one or more parity timeslots following the plurality of data timeslots, transmitting or listening to receive a parity packet associated with that parity timeslot, each parity packet being derived from a set of the data packets associated with that parity timeslot.

Such a method is preferably a method of operating a single node in a network operating according to a method of transmitting packets according to embodiments of the invention described above.

Such a method of operating a single node may comprise any of the optional features and/or may be configured to perform any of the optional behaviours of individual nodes described above with reference to networks and operating methods thereof.

In such embodiments, transmitting or listening to receive a parity packet may comprise listening to receive a parity packet, or transmitting a parity packet derived from a set of parity packets previously transmitted by, received by, and/or derived using one or more parity packets previously received by the node.

In some embodiments, the one or more parity timeslots may comprise one or more synchronous parity timeslots. The method may comprise: during each of the synchronous parity timeslots, if the node previously transmitted, successfully received, or derived using a previously received parity packet, all of the set of data packets associated with that synchronous parity timeslot, transmitting a parity packet derived from that set of data packets, and otherwise, listening to receive a parity packet.

In some embodiments, the one of more parity timeslots may comprise one or more single transmitter parity timeslots, which may each be associated with one node of the network. The method comprises: during each of the single transmitter parity timeslots, if the node is associated with that single transmitter parity timeslot, and the node previously transmitted, successfully received, or derived using a previously received parity packet, all of the set of data packets associated with that synchronous parity timeslot, transmitting a parity packet derived from that set of data packets, and otherwise, listening to receive a parity packet.

In some embodiments, the one or more parity timeslots may be a plurality of parity timeslots, which may comprise one or more synchronous parity timeslots and one or more single transmitter parity timeslots. Each of the one or more single transmitter parity timeslots preferably being associated with one node of the network.

In such embodiments, the method may comprise: during each of the synchronous parity timeslots, if the node previously transmitted, successfully received, or derived from a previously received parity packet, all of the set of data packets associated with that synchronous parity timeslot, transmitting a parity packet derived from that set of data packets, and otherwise, listening to receive a parity packet; and during each of the single transmitter parity timeslots: if the node is associated with that single transmitter parity timeslot, and the node previously transmitted, successfully received, or derived from a previously received parity packet, all of the set of data packets associated with that synchronous parity timeslot, transmitting a parity packet derived from that set of data packets, and otherwise, listening to receive a parity packet.

In such embodiments, the one or more synchronous parity timeslots preferably occur before the one or more single transmitter parity timeslots.

In some method of operating a single node of the network, the data packets may be timestamped and received data packets may be used to synchronize clock of the node with the clocks of other nodes of the network.

According to further embodiments of the invention, there is provided a node of a network configured to operate using the method of operating a single node as described above.

The node may comprise an input/output module, a processor, a memory and/or an antenna. In preferred embodiments, the node comprises an input/output module communicatively connected to an antenna, which is preferably configured to transmit packets to, and receive packets from other nodes of a network comprising the node.

According to further embodiments of the invention, there are provided one or more non-transitory storage media comprising computer instructions executable by one or more processors, the computer instructions when executed by the one or more processors causing the processors to perform a method of operating a node as described above.

FIG. 1a shows diagrammatic views of a network during a plurality of data timeslots 121, 122, 123 of a communication superframe. The network 100 comprises a controller node 110, a first non-controller node 111, a second non-controller node 112, and a third non-controller node 113. Each node 110, 111, 112, 113 is configured to wirelessly transmit packets and to receive packets wirelessly transmitted by the other nodes 110, 111, 112, 113.

The communication superframe comprises five timeslots 121, 122, 123, 124, 125. The first three timeslots 121, 122, 123 are data timeslots, the fourth timeslot 124 is a synchronous parity timeslot, and the fifth timeslot 125 is an single transmitter parity timeslot.

Each of the data timeslots 121, 122, 123 is assigned to one of the non-controller nodes and during each data timeslot 121, 122, 123, the node assigned to that timeslot transmits a data packet and all other nodes of the network listen to receive the transmitted data packet.

In the figures, nodes transmitting during each timeslot are marked with a series or radiating arc shaped lines and transmissions of packets are shown as arrows from transmitting nodes to listening nodes. Successfully received transmissions are denoted by an unbroken arrow, and unsuccessfully received transmissions (dropped packets) are denoted by an arrow with a cross therethrough.

In the first data timeslot 121, the first data node 111 transmits a first data packet and the controller node 110, second data node 112 and the third data node 113 listen to receive the data packet. The data packet is successfully received by the controller node 110 and the second data node 112 but is not received by the third data node 113.

In the second data timeslot 122, the second data node 112 transmits a second data packet and the remaining nodes 110, 111, 113 listen to receive the data packet. The data packet is successfully received by all of the listening nodes 110, 111, 113.

In the third data timeslot 123, the third data node 113 transmits a third data packet and the remaining nodes 110, 111, 112 listen to receive the data packet. The data packet is successfully received by the first and second data nodes 111, 112 but is not successfully received by the controller node 110.

Therefore, after the three data timeslots 121, 122, 123, the first and second data nodes 111, 112 are each aware of the contents of all three data packets. However, the controller node 110 is only aware of the contents of the first and second data packets and the third data node 113 is only aware of the contents of the second and third data packets.

Figure 1B:
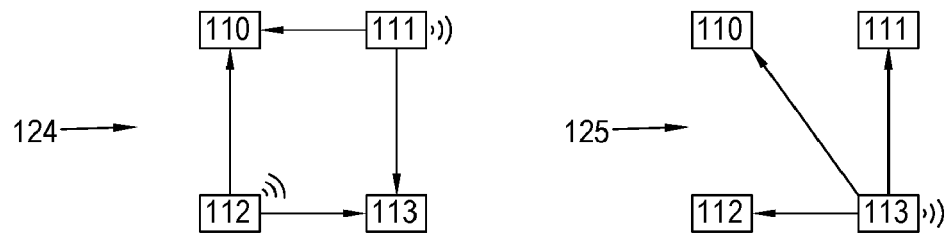
FIG. 1b shows diagrammatic views of the network of FIG. 1a during two parity timeslots following the data timeslots when a first example erasure coding scheme is used.
Figure 1C:
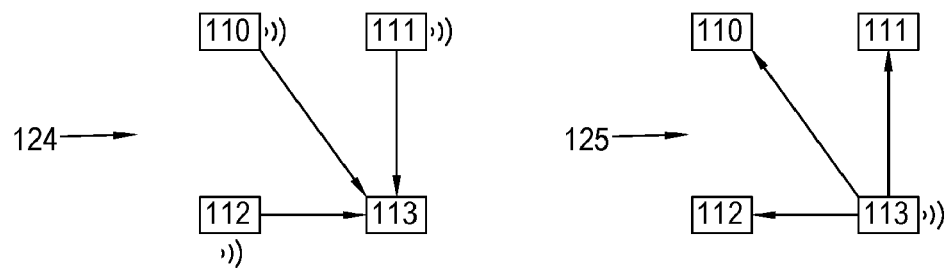
FIG. 1c shows diagrammatic views of the network of FIG. 1a during two parity timeslots following the data timeslots when a second example erasure coding scheme is used.

The three data timeslots are followed by a synchronous parity timeslots 124, which in turn is followed by a single transmitter parity timeslot 125. The first parity packet transmitted during the synchronous parity timeslot 124 (and the second parity packet that is subsequently transmitted during the single transmitter parity timeslot 125) are derived from the three data packets using an erasure coding scheme. Examples of two different sets of first and second parity timeslots 124, 125 are shown in FIGS. 1b and 1c; these two figures show how the operation the parity timeslots 124, 125 differs depending on the coding scheme used to derive the parity packets transmitted therein, despite following an identical set of preceding data timeslots 121, 122, 123.

During the synchronous parity timeslot 124, the nodes 110, 111, 112, 113 are all configured to simultaneously transmit a first parity packet derived from a first set of the previously transmitted data packets if they are aware of the contents of each data packet of that set, and are therefore able to the derive the first parity packet. If the nodes are not aware of the contents of one or more of the data packets of the set, they listen to receive the parity packet. The first set of data packets is dependent upon the coding scheme by which the parity packets are derived from the data packets. Which data packets are included in the first data set is determined by the coding scheme used to derive the parity timeslots 124, 125.

The simultaneously transmitted parity packets constructively interfere and are therefore may be more likely to be successfully received than packets transmitted by only an individual node.

During the single transmitter parity timeslot 125, a selected node, in this example the third node 113, transmits a second parity packet derived from a second set of the previously transmitted data packets if it is aware of the contents of each data packet of that set, and is therefore able to the derive the first parity packet. All non-selected nodes 110, 111, 112 which do not transmit the second parity packet listen to receive the second parity packet. The second set of data packets is also dependent upon the coding scheme by which the parity packets are derived from the data packets. The first and second sets of data packets may be identical or different, depending upon the coding scheme. Which data packets are included in the first data set is determined by the coding scheme used to derive the parity timeslots 124, 125.

FIG. 1b shows the synchronous and single transmitter parity timeslots 124, 125 following the three data timeslots 121, 122, 123 when a first example erasure coding scheme is used to derive parity packets from the data packets.

In the first example erasure coding scheme, each data packet and each parity packet comprises two bits. The bits of the parity packets are derived from the bits of the all three of the data packets using the following formulae, where $d_{i,j}$ is the jth bit in the ith data packet and $p_{i,j}$ is the jth bit in the ith parity packet.

$p_{1,1} = d_{1,1} \oplus d_{2,1} \oplus d_{3,1}$ $p_{1,2} = d_{1,2} \oplus d_{2,2} \oplus d_{3,2}$ $p_{2,1} = d_{1,1} \oplus d_{2,1} \oplus d_{2,2} \oplus d_{3,1}$ $p_{2,2} = d_{1,2} \oplus d_{2,1} \oplus d_{3,1} \oplus d_{3,2}$ In this example erasure coding scheme, any of the five packets (the three data packets and the two parity packets derived therefrom using the coding scheme) may be obtained from any three of the packets, this coding scheme is therefore referred to as an optimal coding scheme. However, only nodes which are aware of the contents of all three data packets (either due to having original transmitted them, having successfully received them during the data timeslot during which they were transmitted, or having derived them from a received parity packet) are able to derive and transmit the parity packets. The sets of data packets from which the first and second parity packets are derived are both all three of the previously transmitted data packets. In this first example erasure coding scheme, the first and second sets of data packets both comprise all three of the transmitted data packets.

The first and second non-controller nodes 111, 112 each derive the first parity packet from the three data packets using the same formulae and then transmit the first parity packet simultaneously.

The controller node 110 and the third non-controller node 113 are each not aware of the contents of one of the data packets and therefore are unable to derive the first parity packet to be transmitted during the synchronous parity timeslot 124. Therefore, these nodes 110, 113 listen during the synchronous parity timeslot 124 to receive the first parity packet.

In the synchronous parity timeslot 124 illustrated in FIG. 1b, the simultaneously transmitted parity packet is successfully received by both the controller node 110 and the third non-controller node 113. Therefore, after the synchronous parity timeslot 124 the controller node 110 and the third non-controller node 113 are both aware of the contents of two of the three data packets and the first parity packet derived from the data packets.

The controller node 110 will be able to derive the first bit of the third data packet ($d_{3,1}$) from the first bits of the first parity packet and the first and second data packets ($p_{1,1}$, $d_{1,1}$, and $d_{2,1}$) and the second bit of the third data packet ($d_{3,2}$) from the second bits of the first parity packet and the first and second data packets ($p_{1,2}$, $d_{1,2}$, and $d_{2,2}$). The controller node 110 will therefore be able to derive the full contents of the third data packet, which it did not successfully receive during the third data timeslot. Similarly, the third non-controller node 113 will be able to derive the full contents of the first data packet, which it did not successfully receive during the first data timeslot.

Therefore by the single transmitter parity timeslot 125 all four of the nodes 110, 111, 112, 113 are aware of the contents of all three of the data packets.

During the single transmitter parity timeslot 125, the selected third non-controller node 113 is aware of the contents of all three of the data packets and is therefore able to derive the second parity packet. The third non-controller node 113 transmits the second parity packet during the single transmitter parity timeslot 125.

In the example illustrated in FIG. 1b, the non-selected nodes 110, 111, 112 each listen to receive the second parity packet. In alternative embodiments, nodes which are already aware of the contents of all of the data packets may not listen during parity timeslots, for example in order conserve electricity by leaving their radio receiver inactive.

FIG. 1c shows the synchronous and single transmitter parity timeslots 124, 125 following the three data timeslots 121, 122, 123 when a second example erasure coding scheme is used to derive parity packets from the data packets.

In the second example erasure coding scheme, each data packet and each parity packet may comprise one bit and the bit of each of the parity packets may be derived from the bits of two of data packets using the following formulae, where $d_i$ is the bit of the ith data packet and $p_i$ is bit of the ith parity packet.

$$p_1 = d_1 \oplus d_2$$

$$p_2 = d_2 \oplus d_3$$

In this second example erasure coding scheme, nodes do not need to be aware of the contents of all three data packets to be able to derive and transmit a parity packet. The set of data packets from which the first parity packet is derived is the first and second previously transmitted data packets and the set of data packets from which the second parity packet is derived is the second and third transmitted data packets. In this second example erasure coding scheme the first set of data packets comprises the first and third data packets and the second set of data packets comprises the second and third data packets.

The controller node 110 and the first and second non-controller nodes 111, 112 each derive the first parity packet from the first and second data packets using the same formulae and then transmit the first parity packet simultaneously.

The third non-controller node 113 is not aware of the contents of the first data packet and therefore is unable to derive the first parity packet to be transmitted during the synchronous parity timeslot 124. Therefore, the third non-controller node 113 listens during the synchronous parity timeslot 124 to receive the first parity packet. In the synchronous parity timeslot 124 illustrated in FIG. 1c, the simultaneously transmitted parity packet is successfully received by the third non-controller node 113. Therefore, after the synchronous parity timeslot 124 the third non-controller node 113 is aware of the contents of the second and third data packets and the first parity packet derived from the first and second data packets.

The third non-controller node 113 will be able to derive the bit of the first data packet ($d_1$) from the bits of the first parity packet and the second data packet ($p_1$ and $d_2$). The third non-controller node 113 will therefore be aware of the contents of all three data nodes.

Therefore, by the time of the single transmitter parity timeslot 125 all three non-controller nodes 111, 112, 113 are aware of the contents of all three of the data packets and the controller node 110 will be aware of the contents of the first and second data packets, but not the third data packet.

During the single transmitter parity timeslot 125, the selected third non-controller node 113 is aware of the contents of the second and third data packets and is therefore able to derive the second parity packet. The third non-controller node 113 transmits the second parity packet during the single transmitter parity timeslot 125.

In the example illustrated in FIG. 1b, the non-selected nodes 110, 111, 112 each listen to receive the second parity packet. As described above with reference to FIG. 1b, in alternative embodiments, the first and second non-controller nodes which are already aware of the contents of all of the data packets may not listen during this parity timeslot.

The controller node 110 successfully receives the second parity packet, and is then able to derive the bit of the third data packet ($d_3$) from the bits of the second parity packet and the second data packet ($p_2$ and $d_2$). All of the nodes 110, 111, 112, 113 are therefore aware of the contents of all three data nodes.

The second example erasure coding scheme advantageously allows nodes which are not aware of the contents of all of the data packets to derive and transmit parity packets. However, unlike in the first example erasure coding scheme it is not guaranteed that a node which receives three of the five packets will be able to derive all of three data packets, this is therefore referred to as a not optimal or suboptimal coding scheme. If the only three packets received by a node are the first and second data packets and the first parity packet, that node will be unable to derive the third data packet. Similarly, if the only three packets received by a node are the second and third data packet and the second parity packet, that node will be unable to derive the first data packet. Of the ten combinations of three packets which may be received by the node, only eight combinations allow for the contents of all three data packets to be learned. Therefore, the chance of full data recovery in the event two lost packets may be estimated as 80%, as opposed to 100% for the first erasure coding scheme.

The estimated chance of full data recovery in the event of two lost packets could be increased to 100% through the edition of a third parity timeslot in which a third parity packet was transmitted, the third parity packet being derived from a third set of data packets consisting of the first and third data packets, such that $p_3 = d_1 \oplus d_3$. In such a modified communication period, receiving any four packets of the six total transmitted packets (three data packets and three parity packets), would allow the remaining two packets to be derived.

In the example, embodiments described above the methods are performed using a relatively simple network comprising only four nodes transmitting one or two bit data packets. It will be appreciated that the methods may be applied to and performed with larger networks comprising greater numbers of nodes, with larger data packets, and/or using greater numbers of data timeslots, synchronous parity timeslots and/or single transmitter parity timeslots.

Figure 2A:
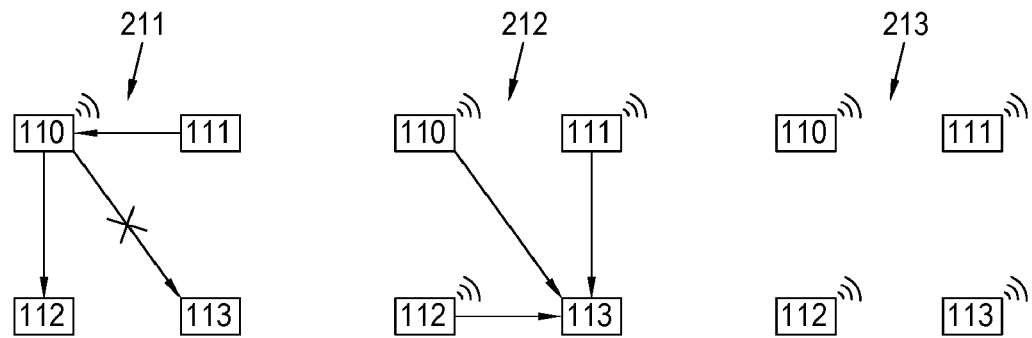
FIG. 2a shows diagrammatic views of the network of FIG. 1a during a controller data timeslot and two controller repetition timeslots of a communication superframe.
Figure 2B:
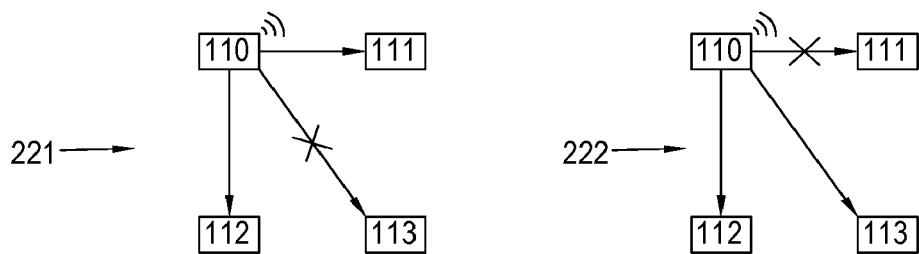
FIG. 2b shows diagrammatic views of the network of FIG. 1a during three controller data timeslots and two controller parity timeslots of a communication superframe.
Figure 2B:
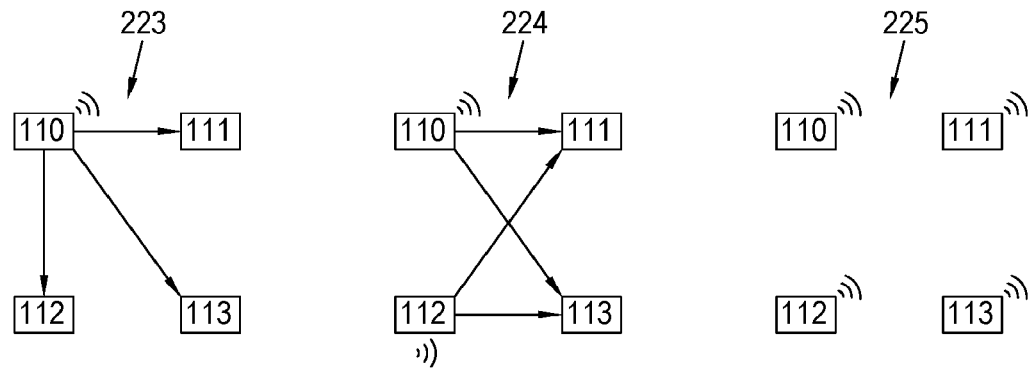

FIGS. 2a and 2b show diagrammatic views of controller timeslots of a communication superframe in which information is transferred from a controller node 110 to all non-controller nodes 111, 112, 113 of the network. Such timeframes are typically performed at the beginning of a communication superframe, and the information transferred from the controller node 110 typically comprises a schedule for subsequent timeslots of the superframe.

As in FIGS. 1a to 1c, the network 100 comprises a controller node 110, a first non-controller node 111, a second non-controller node 112, and a third non-controller node 113. Each node 110, 111, 112, 113 being configured to wirelessly transmit packets and to receive packets wirelessly transmitted by the other nodes 110, 111, 112, 113.

FIG. 2a shows diagrammatic views of a network during a controller data timeslot 211 and a pair of controller parity timeslots 212, 213 of a communication superframe. The controller data timeslot 211 and two controller parity timeslots 212, 213 are used to distribute a single controller data packet from the controller node 110 to all other nodes on the network.

In the controller data timeslot 211, the controller node 110 transmits a controller data packet and the non-controller nodes 111, 112, 113 listen to receive the controller data packet. In the illustrated controller data timeslot 211, the first and second non-controller nodes 111, 112 successfully receive the controller data packet, but the third non-controller node 113 does not.

In each of the controller parity timeslots 212, 213, the controller node 110 and any of the non-controller nodes 111, 112, 113 which successfully received the controller data packet in a previous timeslot, simultaneously retransmit the controller data packet (as a controller parity packet). All non-controller nodes that have not previously successfully received the controller data packet listen to receive it during the controller parity timeslot.

In the first controller parity timeslot 212, the controller data packet is simultaneously transmitted by the controller node 110 and by the first and second non-controller nodes 111, 112. As in the synchronous parity timeslots 124 described above, the simultaneously transmitted packets constructively interfere and the third non-controller node successfully receives the controller data packet.

In the second controller parity timeslot 212, the controller data packet is simultaneously transmitted by the controller node 110 and by all three non-controller nodes 111, 112, 113. No nodes are listening, as all nodes are already aware of the contents of the controller data packet.

FIG. 2b shows diagrammatic views of a network during three controller data timeslots 221, 222, 223 and a pair of controller parity timeslots 224, 225 of a communication superframe. These timeslots 221, 222, 223, 224, 225 are used to distribute three controller data packets from the controller node 110 to all other nodes on the network.

In each controller data timeslot 221, 222, 223 the controller node 110 transmits a controller data packet and the non-controller nodes 111, 112, 113 listen to receive the controller data packet. In the first illustrated controller timeslot 221, the first and second non-controller nodes 111, 112 successfully receive a first controller data packet, but the third non-controller node 113 does not. In the second controller timeslot 222, the second and third non-controller nodes 112, 113 successfully receive a second controller data packet, but the first non-controller node 111 does not. In the third controller timeslot 223, all three non-controller nodes 111, 112, 113 successfully receive a third controller data packet.

In each of the controller parity timeslots 224, 225 the nodes 110, 111, 112, 113 are all configured to simultaneously transmit a controller parity packet derived from a set of the previously transmitted controller data packets if they are aware of the contents of each controller data packet of that set, and are therefore able to the derive the controller parity packet. If the nodes are not aware of the contents of one or more of the controller data packets of the set, they listen to receive the parity packet.

In the illustrated first controller parity timeslot 224, a first controller parity packet derived from all three controller data packets (for example, using the first example coding scheme described above with reference to FIG. 1b) is simultaneously transmitted by the controller node 110 and the second non-controller node 112. The first controller parity packet is received by all three non-controller nodes, and the first and third non-controller nodes 111, 113 are therefore able to derive the controller data packets that they did not receive during the controller timeslots 221, 222.

In the illustrated second controller parity timeslot 225, all four nodes 110, 111, 112, 113 simultaneously transmit a second controller parity packet derived from all three controller data packets. None of the nodes 110, 111, 112, 113 listen to receive the second controller parity packet as all are already aware of the contents of all of the controller data packets and controller parity packets.

A single communication superframe may comprise: one or more controller data timeslots, in which controller data packets are transmitted by a network's controller node; optionally one or more controller parity timeslots, for subsequently distributing the contents of the controller data packets to additional non-controller nodes; a plurality of data timeslots, in which data packets are subsequently transmitted from individual non-controller nodes to all other nodes on the network; and one or more parity packets, for subsequently allowing nodes to derive the contents of data packets which they did not successfully receive during the data timeslots.

Figure 3:
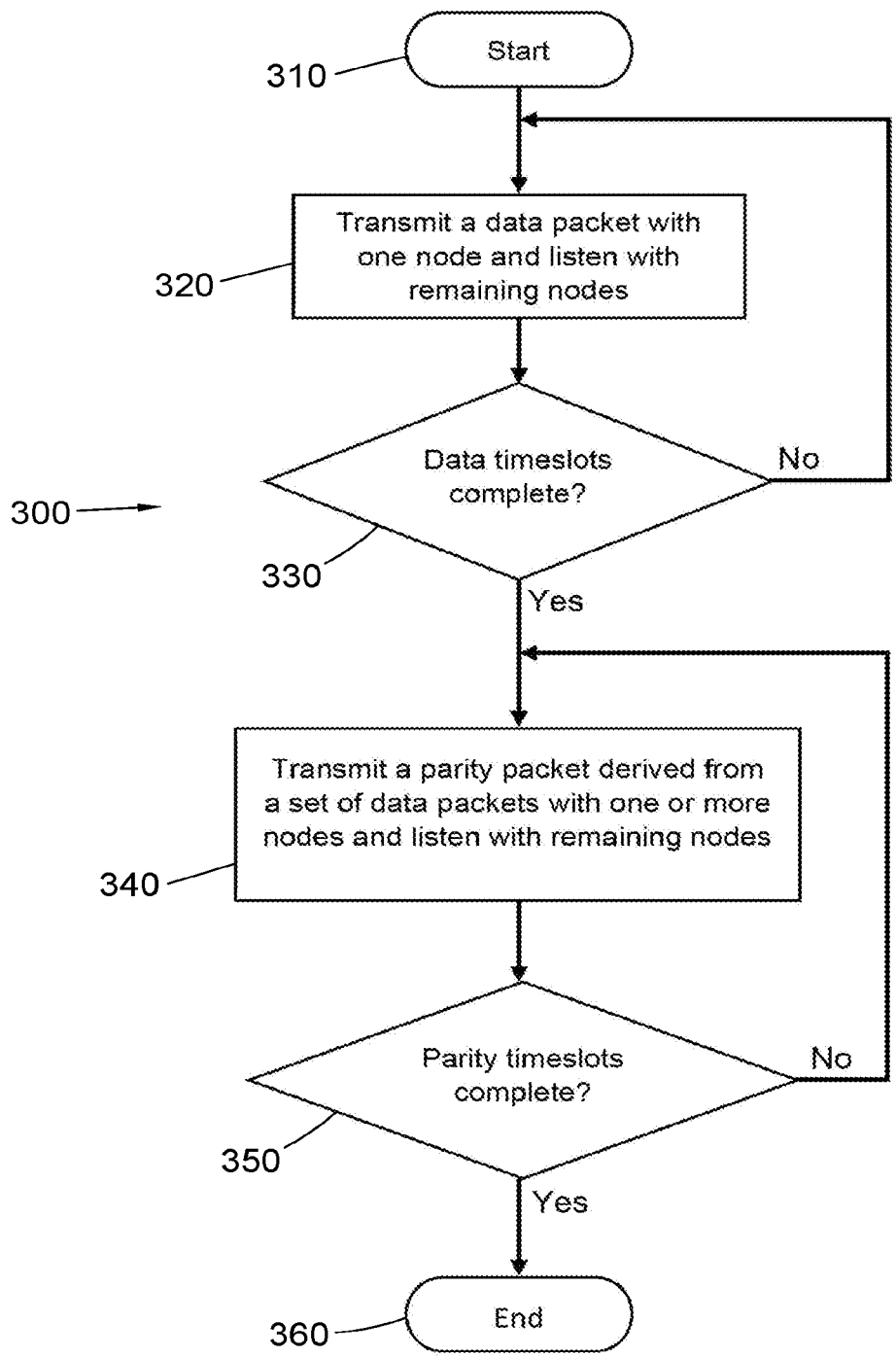
FIG. 3 is a flow chart of a first method of transmitting packets between nodes of a network.

FIG. 3 is a flow chart showing steps of a first method 300 for communicating between nodes of a network comprising a plurality of nodes. The method uses a time division multiple access scheme and the time period over which the communication is performed is divided into a plurality of timeslots 320, 340 including a plurality of data timeslots 320 and one or more parity timeslots 340.

After the method is started 310, a first data timeslot 320 is performed. During each data timeslot 320, one of the plurality of nodes of the network transmits a data packet and all other nodes of the network listen to receive the transmitted data packet. After the first data timeslot 320 is performed, a number of subsequent data timeslots 320 are performed. In each data timeslot 320 one node transmits a data packet and all other nodes listen.

After a set number of data timeslots 320 are complete 330, one or more parity timeslots 340 are performed. During each parity timeslot 340, one or more of the plurality of nodes transmits a parity packet derived from a set of one or more of the data packets transmitted during the multiple data timeslots 320 and all nodes which do not transmit the parity packet listen to receive the parity packet.

After a set number (one or more) of parity timeslots are complete 350, the time period over which the communication is performed ends 360.

The communication time periods illustrated by FIG. 1a followed by FIG. 1b, FIG. 1a followed by FIG. 1c, and by FIG. 2a and FIG. 2b in isolation are examples of such a method.

Figure 4:
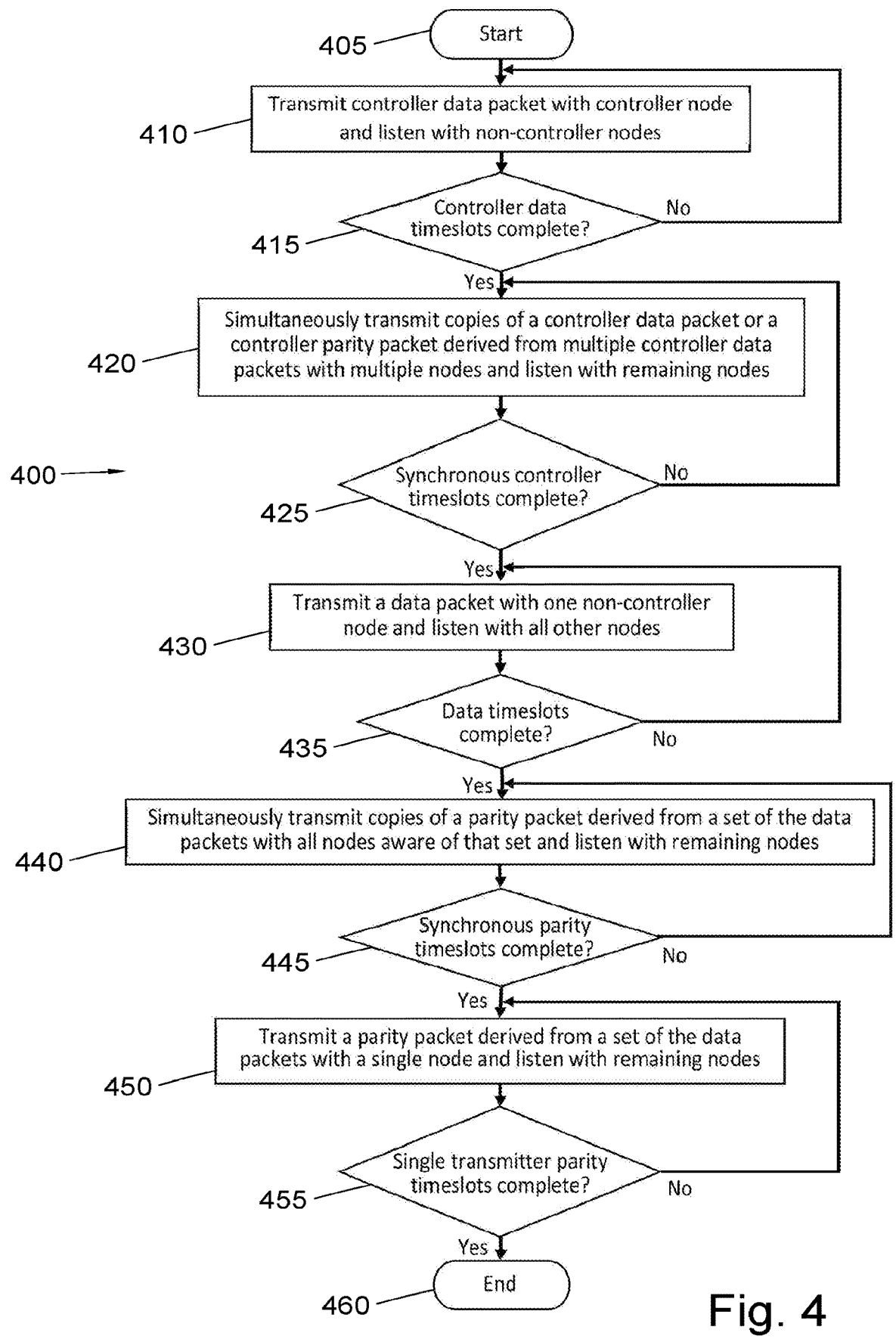
FIG. 4 is a flow chart of a second method of transmitting packets between nodes of a network.

FIG. 4 is a flow chart showing steps of a preferred second method 400 for communicating between nodes of a network comprising a controller node and a plurality of non-controller nodes. The steps of a single communication cycle referred to as a superframe are illustrated, within the superframe one or more packets are transmitted by each node to all other nodes of the network.

Such a method may be used in wireless networks in which it is necessary to transmit controller information from the controller node to all of the non-controller nodes and for information from each of the non-controller nodes to be transmitted to the controller node within a communication cycle (which may have a fixed duration). Transmission of information from each non-controller node to all other non-controller nodes may not be required as an outcome of the communication cycle but may increase the reliability of information from non-controller nodes being received by the controller node by allowing non-controller nodes to derive and transmit parity packets.

It will be appreciated that multiple superframes may be performed using the method, for example, to maintain regular communication between the nodes of the network.

The superframe is divided into a pre-set series of timeslots according to a time division multiple access scheme; within each timeslot one or more nodes transmit a packet and the remainder of the nodes listen to receive the transmitted packet. The series of timeslots consists of one or more controller data timeslots, one or more synchronous controller parity timeslots, a plurality of data timeslots, one or more synchronous parity timeslots and one or more single transmitter parity timeslots, in that order. The number of each designation of timeslots and the timings of each time slot are pre-set.

After the superframe starts 405, a first portion of the superframe is formed by one or more controller data timeslots 410, during each of which the controller node transmits a controller data pack and all non-controller nodes of the network listen to receive the controller data packet.

After the one or more controller data timeslots are complete 415, one or more synchronous controller parity timeslots 420 are performed during which a plurality of nodes simultaneously transmit controller parity packets to increase the likelihood of all nodes being informed of the contents of the controller data packets transmitted during the preceding controller data timeslots 410. The controller parity packets are derived from sets of one or more of the controller data packets.

In some embodiments, the controller parity packets may be retransmitted copies of a single controller data packet. For example during the controller parity timeslot the controller node, and any non-controller node that received a specific controller data packet during a preceding timeslot (during a controller data timeslot or a preceding controller parity timeslot) may simultaneously retransmit that controller data packet while all other nodes listen. Such controller parity timeslots 420 may be used in embodiments in which only a single controller data packet is transmitted in only a single controller data timeslot, such as the example described above with reference to FIG. 2a.

Alternatively, the controller parity timeslots 420 may be timeslots in which the controller node, and any non-controller node which is aware of the contents of a set of multiple controller data packets associated with the controller parity timeslot, simultaneously transmit that controller parity packet derived from that set of controller data packets while all other nodes listen. Such synchronous controller parity timeslots 420 may be used in embodiments in which only multiple controller data packets are transmitted over multiple controller data timeslots 410, such as the example described above with reference to FIG. 2b. In some such embodiments the set of controller data packets associated with one or all of the controller parity timeslots may be all of the controller data packets.

The controller data packets may comprise a schedule. The schedule assigns each of the plurality of pre-set data timeslots 430 to one of the non-controller nodes of the network. In normal superframes each of the non-controller nodes is preferably assigned at least one of the data timeslots 430 such that a data packet is transmitted by all of the non-controller nodes, this may allow the controller node to detect when a node fails or is otherwise unable to reliably transmit data packets receivable or derivable by the controller node. In the event such a detection occurs, emergency superframes may be performed in which the schedule assigns all of the data timeslots 430 to nodes that the controller node has not received or derived data packets from in a threshold number of preceding superframes.

The schedule also assigns one of the non-controller nodes to each of the single transmitter parity timeslots 450. Which of the non-controller nodes is assigned to a single transmitter parity timeslots 450 is determined by the controller node in order to maximise the probability of a parity packet being successfully received by the controller node within the single transmitter parity timeslot 450. Methods of calculating such a probability are described earlier in the description.

The schedule therefore informs the non-controller nodes whether to transmit or to listen during each of the data timeslots 430 and single transmitter parity timeslots 450.

In some embodiments, the schedule may also determine which sets of data packets are associated with each of the synchronous and single transmitter parity timeslots 440, 450. Alternatively, each of the synchronous and single transmitter parity timeslots 440, 450 may be associated with a pre-set set of data timeslots 430 and the parity packets of that parity timeslot 440, 450 may be derived from the set of data packets transmitted during that associated pre-set set of data timeslots 430. The manner or formula by which the parity timeslots are derived from the set of data timeslots may also be pre-set or assigned by the schedule.

After the one or more synchronous controller timeslots 420 are complete 425, the plurality of data timeslots 430 are performed. During each data timeslot 430, the non-controller node assigned to that data timeslot 430 transmits a data packet and all other nodes listen to receive the data packet.

After the plurality of data timeslots 430 are complete 435, one or more synchronous parity timeslots 440 are performed. During each synchronous parity timeslot 440, all of the nodes which are aware of the contents of all of a set of data packets associated with that synchronous parity timeslot 440 simultaneously transmit copies of a parity packet derived from that set of data packets. All other nodes listen to receive the parity packet. The simultaneously transmitted copies of the parity packet will constructively interfere, increasing the probability of their successful receipt by listening nodes.

Nodes may be aware of the contents of a data packet as a consequence of having transmitted that data packet during a data timeslot, having successfully received that data packet during a data timeslot, or having received a parity packet derived from a set of data packets including that data packet during a previous parity timeslot and having calculated the data packet therefrom. Examples of parity packets are described above with reference to FIGS. 1b and 1c.

After the one or more synchronous parity timeslots 440 are complete 445, one or more single transmitter parity timeslots 450 are performed. During each single transmitter parity timeslot 450, if the node assigned to that single transmitter parity timeslot 450 is aware of the contents of all of the set of data packets associated with that timeslot 450 it transmits a parity packet derived from that set of data packets. All other nodes listen to receive the parity packet.

After the one or more single transmitter parity timeslots 450 are complete 455, the superframe ends 460.

The controller data packets transmitted during the controller data timeslots 410 and the data packets transmitted during the data timeslots 430 are timestamped and are used to synchronize the clocks of the nodes as described above.

Each data packet transmitted by one of the plurality of non-controller nodes is part of a set of K data packets from which N−K parity packets are derived. The parity packets are derived using an optimal coding scheme such that any data packet of the set can be derived from any K packets of the N total packets consisting of the K data packets of the set and the N−K parity packets derived therefrom.

Assuming that the probability of a packet transmitted by one or more non-controller node not being received by the controller node is $p_b$, and that all N−K parity packets are derived and transmitted by one or more non-controller nodes, the probability of the controller node receiving K or more of the N total packets, and thereby being aware of the contents of any and all of the K data packets, is given by:

$$\Sigma_{k=K}^{N} \binom{N}{k}(1-p_b)^k p_b^{N-k}$$

However, it is also possible when performing the method for none of the non-controller nodes to be able to derive and transmit a parity packet (for example, in situations in which each parity packet is to be derived from all K data packets of a set but no non-controller node is aware of all of these data packets at the end of the data timeslots). In such situations, the controller node may still be aware of all of the data packets of the set if it successfully received the data packets in the data timeslots in which they were originally transmitted. Assuming that the probability of one non-controller node failing to successfully receive a transmission from another non-controller node is $p_c$ the probability of a non-controller node receiving all K data packets of the set (and thereby deriving and transmitting a parity packet) is given by:

$$(1-p_c)^K$$

Assuming that the network consists of a controller node and L non-controller nodes, the probability that none of the non-controller nodes receive all K data packets of the set (and that therefore no parity packets are transmitted) is given by:

$$(1-(1p_c)^K)^{L-1}$$

As such the total probability of the controller node being aware of the content of all K data packets of a given set of K data packets is given by:

$$((1-(1-p_c)^K)^{L-1}(1-p_b)^K)+((1-(1-p_c)^K)^{L-1})\Sigma_{k=K}^{N}\binom{N}{k}(1-p_b)^k p_b^{N-k})$$

It may be assumed that the probability of a transmission from a non-controller node being successfully received by the controller node is the same as being successfully received by a non-controller node, such that $p_b=p_c$.

This probability may be used to estimate the reliability of utilising a specific coding scheme in a network comprising a given number of non-controller nodes as a function of the reliability of transmissions between nodes. Such an estimation may be used to select a coding scheme and/or the manner in which a time period is divided into data and parity timeslots.

In a first example battery management unit comprising 300 cell management units (such that L=300), which must each transmit a data packet to a controller node within a 100 to 120 millisecond cycle time communication period. Assuming a Bluetooth® low-energy 2 Mbps PHY layer and a packet length of 47 B, the time communication period may be divided into approximately 390 timeslots.

Therefore, if all cell management units transmit data packets over the same frequency within the communication period, the ratio of data timeslots to parity timeslots (the code rate of the coding scheme by which the parity packets are derived from the set of associated data packets) must be at least 300/390=0.77 (to 2 decimal places). An erasure coding scheme in which a single parity packet is derived from each set of 4 data packets could therefore by used (such that K=4, N=5) as this would have a code rate of 4/5=0.8.

Figure 5A:
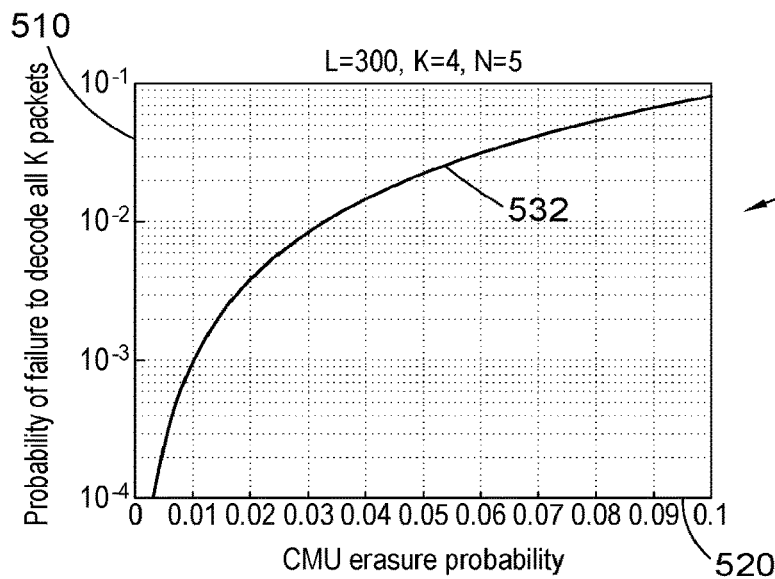
FIG. 5a is a graph of the probability of a controller node failing to obtain all four data packets of a set from which a single parity packet is derived at different probabilities of inter-node transmissions failing.

FIG. 5a is a graph 530 showing the relationship 532 between the probability 510 of the controller node of such a battery management unit not being aware of the content of all 4 data packets of a set at the end of communication period (probability of failure to decode all K packets) as a function of the probability 520 of a node not successfully receiving a packet transmitted from a non-controller node (CMU erasure probability, $p_b$ or equivalently $p_c$). The probability of the controller node failing to receive or decode all K data packets of a set is below a target of $10^{-3}$ (for achieving 99.9% reliability and a single reporting error per 10 years of operation) if the probability of a packet not being successfully transmitted is less than $10^{-2}$ (99% link reliability between nodes).

This transmission link reliability may be difficult to achieve and therefore the cell management units may be divided between multiple channels. This allows a smaller number of data packets to be transmitted on each channel within the communication period, reducing the number of data timeslots and allowing a greater ratio of parity to data timeslots and a lower code rate. This allows a target probability of the controller node receiving or deriving all K data packets of a set to be achieved with lower link reliabilities (higher probabilities of a node not receiving a packet transmitted from a non-controller node).

In order to reduce costs and complexity of the battery management unit, each cell management unit may only be able to transmit and receive packets on one channel at a time, while the controller unit may be able transmit and receive packets on multiple channels simultaneously using multiple transceivers. This may allow the steps of a method as described above to be performed simultaneously on multiple different channels within the battery management unit.

The plurality of non-controller nodes may be divided into separate groups or classes, each of which communicate with the controller node using a separate channel. For example, in embodiments wherein the battery management unit comprises 300 cell management units as described above and 3 channels (C=3) are available, the cell management units may be divided into 3 groups of 100 cell management units, requiring 100 data timeslots within the 100 to 120 millisecond communication period and the 390 timeslots thereof. The code rate must therefore exceed 100/390=0.26 (to 2 decimal places). An erasure coding scheme in which 5 parity packets are derived from each set of 2 data packets could therefore by used (such that K=2, N=7) as this would have a code rate of 2/7=0.29 (to 2 decimal places).

Figure 5B:
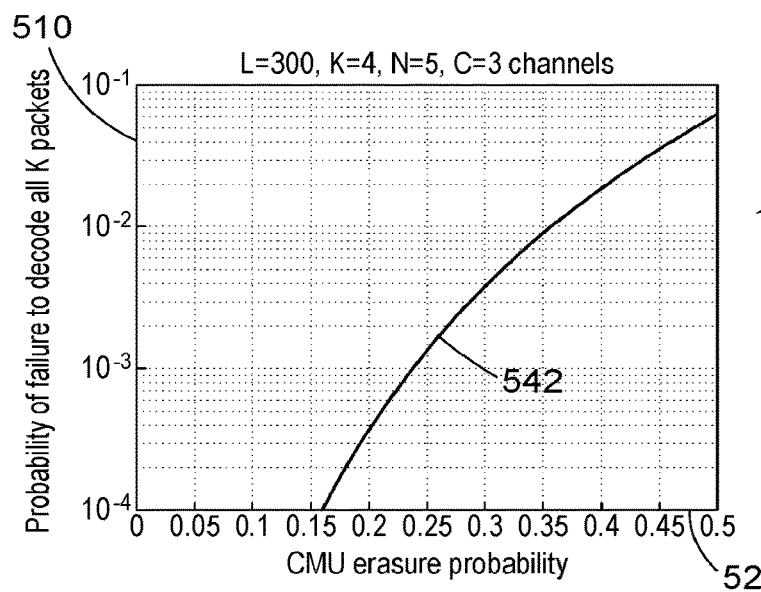
FIG. 5b is a graph of the probability of a controller node failing to obtain all four data packets of a set from which a single parity packet is derived at different probabilities of inter-node transmissions failing, when non-controller nodes are divided between three different channels.

FIG. 5b is a graph 540 showing the relationship 542 between the probability 510 of the controller node failing to decode all K packets as a function of the CMU erasure probability 520 in the situation where three channels are used. The probability of the controller node failing to receive or decode all K data packets of a set is below the target of $10^{-3}$ if the probability of a packet not being successfully transmitted is less than 0.237 (86.3% link reliability between nodes).

A second example battery management unit may comprise 56 battery management units (L=56) which must communicate with a controller node comprising 392 timeslots. When using only a single channel, the code rate must exceed 56/392=1/7. This may be achieved using a simple repetition coding scheme in which six parity packets transmitted as copies of a single data packets, such that K=1 and N=7. Using such a coding scheme, the probability of the controller node being aware of a data packet simplifies to:

$$(p_c^{L-1} \times (1-p_b)) + ((1-p_c^{L-1}) \times (1-p_b^N))$$

Assuming that the probability of a transmission from a non-controller node being successfully received by the controller node is the same as being successfully received by a non-controller node, such that $p_b = p_c$, this simplifies to:

$$p_c^L + p_c^N - p_c^{N+L-1}$$

If the number of cell management units L is much greater than the coding block size N, the probability of failure is dominated by $p_c^N$. If the cell management units are shared between multiple channels, the effect number of cell management units is reduced to L/C and the lower bound on the code rate is decreased. For example, if three channels were used such that C=3 the minimum code rate is reduced to (56/3)/392=1/21. This may be achieved with twenty repetition parity packets, such that K=1 and N=21.

Figure 5C:
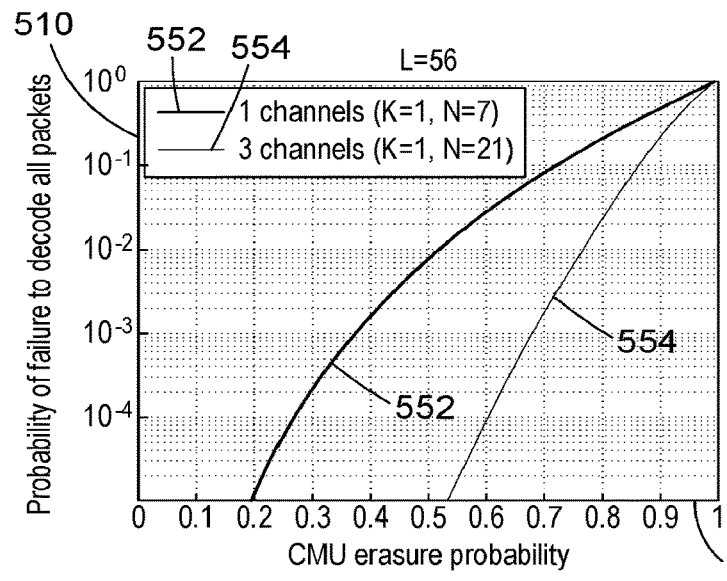
FIG. 5c is a graph of the probabilities of a controller node failing to obtain a data packet retransmitted multiple times as a parity packet at different probabilities of inter-node transmissions failing, when non-controller nodes use a single channel and when non-controller nodes are divided between three different channels.

FIG. 5c is a graph 550 showing the relationships 552, 554 between the probabilities 510 of the controller node failing to decode all K packets as a function of the CMU erasure probability 520 where one channel and six repletion parity packets are used 552 and where three channels and twenty repetition parity packets are used 554.

The probability of the controller node failing to receive or decode all K data packets of a set is below the target of $10^{-3}$ if the probability of a packet not being successfully transmitted is less than 0.37 (63% link reliability between nodes) where a single channel is used and less than 0.68 (32% link reliability) where three channels are used.

Figure 6A:
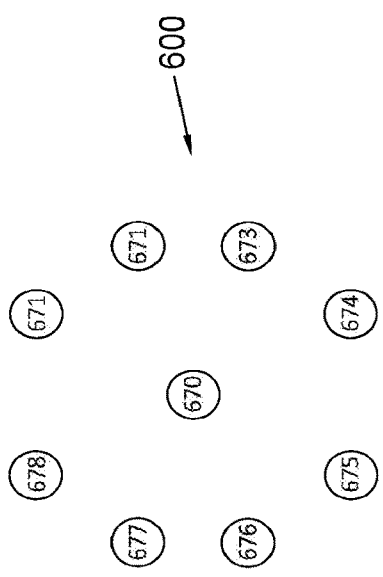
FIG. 6a is an overview of a network comprising a controller node and eight non-controller nodes.
Figure 6B:
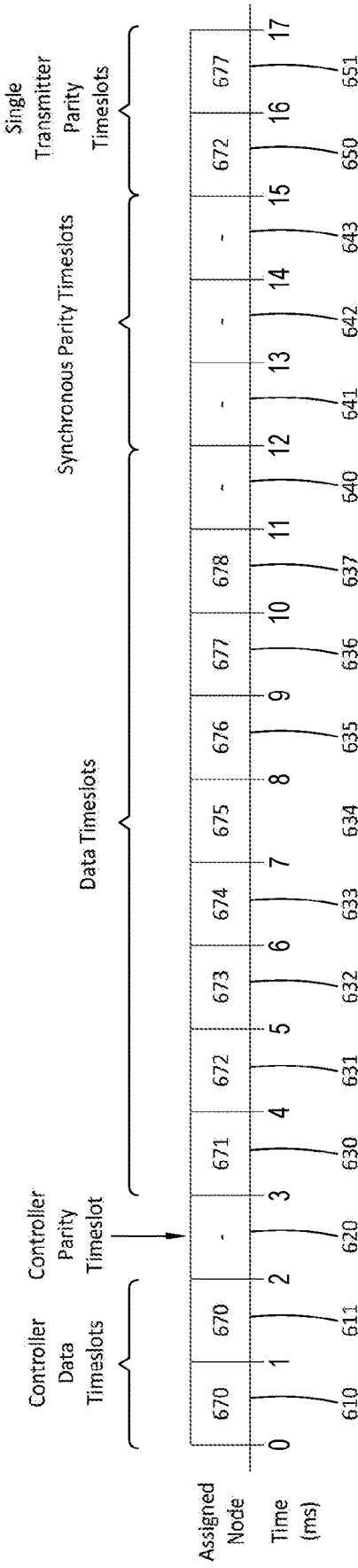

FIG. 6a is a diagrammatic overview of a wireless network 600 comprising a controller node 670 and eight non-controller nodes 671, 672, 673, 674, 675, 676, 677, 678. FIG. 6b is a timeline of a schedule 601 of a communication time period superframe of the network 600.

In the embodiment the communication time period has a duration of seventeen microseconds and is divided into a pre-set series of seventeen one-microsecond-duration timeslots. The series comprises two controller data timeslots 610, 611, followed by one controller parity timeslot 620, followed by eight data timeslots 630, 631, 632, 633, 634, 635, 636, 637, followed by four synchronous parity timeslots 640, 641, 642, 643, followed by two single transmitter parity timeslots 672, 673.

The two controller data timeslots 610, 611 are pre-assigned to the controller node, such that each node is aware, before the schedule 601 of the superframe that the controller node 670 is to transmit during these timeslots and the non-controller nodes 671, 672, 673, 674, 675, 676, 677, 678 are to listen. During each controller data timeslot 610, 611 the controller node 670 distributes a controller data packet (different controller data packets are transmitted in each of the controller data timeslots 610, 611) and the two controller data packets together define the schedule 601. The schedule 601 informs nodes whether to listen or to transmit during the data timeslots 630, 631, 632, 633, 634, 635, 636, 637 and during the single transmitter parity timeslots 672, 673.

The two controller data timeslots 610, 611 are followed by a single controller parity timeslot 620. The controller parity timeslot 620 is a synchronous controller parity timeslot and therefore is not assigned to any individual node or set of nodes. Instead, any node which is aware of the contents of all of a set of controller data packets (in the illustrated example, both of the controller data packets transmitted during the two controller data timeslots 610, 611) derives a controller parity packet from those controller data packets using a pre-set formula and simultaneously transmit that controller parity packet. In the illustrated controller parity timeslot 620, the controller node 670 and any of the non-controller nodes 671, 672, 673, 674, 675, 676, 677, 678 that received both controller data packets during the two controller data timeslots 610, 611 will derive and transmit a controller parity packet. All non-transmitting nodes listen to receive the controller parity packet.

The controller parity packet is preferably derived from the two controller data packets using an optimal coding scheme such that any combination of the controller parity packet and one of the two controller data packets can be used to derive the other of the controller data packets. Therefore, the controller parity timeslot 620 acts to increase the probability of all non-controller nodes being aware of the schedule 601.

The controller parity timeslot 620 is followed by eight controller data timeslots 630, 631, 632, 633, 634, 635, 636, 637 for transmission of a data packet from a single node. In the illustrated schedule, the eight controller data timeslots 630, 631, 632, 633, 634, 635, 636, 637 are each assigned to a different one of the eight non-controller nodes 671, 672, 673, 674, 675, 676, 677, 678.

This is a standard communication superframe of the network 600. In other superframes the controller data timeslots 630, 631, 632, 633, 634, 635, 636, 637 may be assigned differently. For example, one or more emergency superframes may be triggered by the controller node 670 failing to receive or derive a data packet transmitted by one or more of the non-controller nodes 671, 672, 673, 674, 675, 676, 677, 678 for a threshold number of standard communication superframes in a row. The controller data packets and/or the schedule thereof may be used to inform non-controller nodes that an emergency superframe is to be performed.

In an emergency superframe, the eight controller data timeslots 630, 631, 632, 633, 634, 635, 636, 637 may be divided between the one or more non-controller nodes whose data packets the controller node 670 failed to obtain. In each of the data timeslots one of these one or more non-controller nodes may transmit a data packet. For example, one of the data packets which the controller node 670 failed to obtain in a previous standard superframe may be transmitted in each data timeslot. Alternatively, the data packet that a node assigned to a data timeslot would have transmitted if the emergency superframe was instead a standard superframe may be transmitted.

If the one or more non-controller nodes assigned to data timeslots in the emergency superframe are a plurality of non-controller nodes, each of these nodes is assigned to as close to an equal number of controller data timeslots as possible. For example, if the eight data timeslots of an emergency superframe are to be divided between two nodes, each node may be assigned to four data timeslots, and if they are to be divided between three nodes, two of the nodes may be assigned three data timeslots and the remaining node may be assigned two data timeslots.

In such embodiments, the data timeslots assigned to each of the nodes may be distributed as evenly as possible over the series of eight data timeslots, in order to reduce the possibility of a period of poor connectivity resulting in all the packets from one of the nodes being lost. For example, if an emergency superframe is triggered by the controller node 670 failing to receive data packets from the third, fourth and eighth non-controller nodes 673, 674, 678, the third non-controller node 673 may be assigned to the first, fourth and seventh data timeslots 630, 633, 636, the fourth non-controller node 674 may be assigned to the second, fifth and eighth data timeslots 631, 634, 637, and the eighth non-controller node 678 may be assigned to the third and sixth data timeslots 632, 635.

It will be appreciated that features of emergency superframes as described above may be applied to other networks and other schedules and/or series of timeslots.

The data timeslots 630, 631, 632, 633, 634, 635, 636, 637 are divided into two groups of four data timeslots, the first group consisting of the first to fourth data timeslots 630, 631, 632, 633, and the second group consisting of the fifth to eighth data timeslots 634, 635, 636, 637. In this example the timeslots of each group are consecutive, though this is not necessary and other embodiments of the invention may utilise groups of non-consecutive timeslots.

The data timeslots 630, 631, 632, 633, 634, 635, 636, 637 are followed by four synchronous parity timeslot 640, 641, 642, 643. The parity timeslots 640, 641, 642, 643 are not assigned to any individual node or set of nodes. Instead, each parity timeslot is associated with a set of the data timeslots and the data packets transmitted therein. The first and third parity timeslots 640, 642 are associated with sets of data timeslots comprised by or consisting of the first group of data timeslots 630, 631, 632, 633. The second and fourth parity timeslots 641, 643 are associated with sets of data timeslots comprised by or consisting of the second group of data timeslots 634, 635, 636, 637.

In the illustrated embodiment, which data timeslots each synchronous parity timeslot is associated with are be pre-set and identical between iterations of the superframe, however, embodiments these may set by the schedule.

During each synchronous parity timeslot 640, 641, 642, 643 all of the nodes that are aware of the contents of all of the data packets transmitted during the set of associated data timeslots derive a parity packet from those data packets and simultaneously transmit that parity packet. Nodes may be aware of the content of a data packet as a consequence of having transmitted that data packet, of having successfully received that data packet in the data timeslot in which it was transmitted, or of having successfully received one or more parity packets derived using that data packet in a previous data timeslot and using the contents of other packets of which it was aware, and the known coding scheme by which eh parity packet was derived to obtain the data packet.

The synchronous parity timeslot 640, 641, 642, 643 are followed by a pair of single transmitter parity timeslots 650, 651. The single transmitter parity timeslots 650, 651 are each assigned a non-controller node to transmit therein. The assigned non-controller nodes are selected to maximise the probability of the assigned node successfully receiving and/or deriving each of the data packets (or each of the data packets of a set of data timeslots associated with the single transmitter parity timeslot), and the controller node successfully receiving a packet transmitted by the assigned node. These probabilities are estimated by the controller node using information contained in data packets transmitted during previous superframe. In the illustrated example schedule 601, different nodes 672, 677 have been assigned to each of the single transmitter parity timeslots 650, 651, although in other embodiments, the same node may be assigned to some or all single transmitter parity timeslots of a superframe.

The first single transmitter parity timeslot 651 is associated with a set of data timeslots comprised by or consisting of the first group of data timeslots 630, 631, 632, 633 and the second single transmitter parity timeslot 651 is associated with a set of data timeslots comprised by or consisting of the second group of data timeslots 634, 635, 636, 637.

Figure 7:
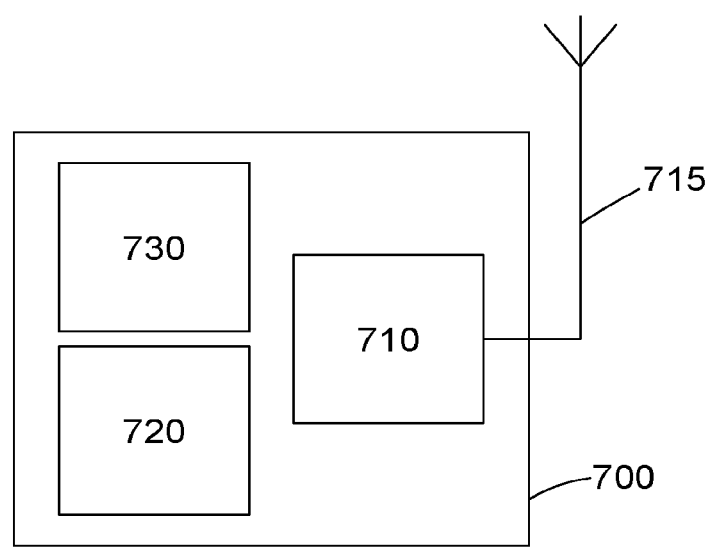
FIG. 7 shows a node of a network.

FIG. 7 is a diagrammatic view of a node 700. The node 700 comprises an input/output module 710, a processor 720 and a memory 730. The input/output module 710 is communicatively connected to an antenna 715 which is configured to receive packets from and to transmit packets to, other nodes via wireless network. The processor 720 the input/output module 710 and the memory 730 are coupled. The memory 730 stores computer program instructions that when executed by the processor 720 cause the node to perform sets of a method described herein.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method of comprising:
in a first data timeslot, transmitting a first data packet with one of a first node of a network and a second node of the network and receiving the first data packet with a remainder of the first node and the second node;
in a second data timeslot, transmitting a second data packet with one of the first node and the second node and receiving the second data packet with a remainder of the first node and the second node; and
in a parity timeslot following the first data timeslot and the second data timeslot, transmitting a parity packet with one or more of the first node and the second node and receiving the parity packet with the remainder of the first node and the second node,
wherein the parity packet is derived from a set of one or a plurality of the first data packet and the second data packet transmitted during the first data timeslot and the second data timeslot, and
the parity timeslot includes a synchronous parity timeslot.

2. The method according to claim 1, wherein the parity packet is derived from a set of the first data packet and the second data packet transmitted during the first data timeslot and the second data timeslot.

3. The method according to claim 1, further comprising in the parity timeslot, simultaneously transmitting a same parity packet with two or more of nodes and receiving the parity packet with the remainder of the nodes.

4. The method according to claim 1, further comprising in the parity timeslot, transmitting a parity packet with one of the first node and the second node and receiving the parity packet with the remainder of the first node and the second node.

5. The method according to claim 1, wherein the parity timeslot includes a plurality of parity timeslots and further includes a single transmitter parity timeslot, the method comprising:
in the synchronous parity timeslot, simultaneously transmitting a parity packet associated with a timeslot with two or more of nodes and receiving the parity packet with the remainder of the nodes, the nodes including the first node and the second node; and
in the single transmitter parity timeslot, transmitting a parity packet associated with a timeslot with a single node of the nodes and receiving the parity packet with the remainder of the nodes.

6. The method according to claim 5, wherein the synchronous parity timeslot occurs before the single transmitter parity timeslot.

7. The method according to claim 5, wherein the nodes include a controller node and a non-controller node, and a node which transmits a parity packet during the single transmitter parity timeslot is selected in dependence upon:
- a probability of the non-controller node successfully transmitting a parity packet to the controller node, and
- a probability of the non-controller node having at least one of transmitted, successfully received, or derived, using a previously received parity packet, the first data packet and the second data packet, the parity packet to be transmitted in the single transmitter parity timeslot being to be derived from the first data packet and the second data packet.

8. The method according to claim 5, wherein the nodes which simultaneously transmit a same parity packet in the synchronous parity timeslot are nodes which have at least one of transmitted, successfully received, or derived, using a previously transmitted parity packet, the first data packet and the second data packet, the parity packet being to be derived from the first data packet and the second data packet.

9. The method according to claim 1, wherein the first data packet and the second data packet are timestamped and are used to synchronize clocks of the first node and the second node.

10. The method according to claim 1, wherein the first node and the second node of the network include a controller node, and
the method further comprising:
in a controller data timeslot, transmitting a controller data packet with the controller node and receiving the controller data packet with a remainder of the first node and the second node, the remainder being not the controller node.

11. The method according to claim 10, wherein the controller data timeslot precedes the first data timeslot and the second data timeslot and wherein which node of the first node and the second node transmits the first data packet in the first data timeslot and the second data packet in the second data timeslot is scheduled using the controller data packet.

12. The method according to claim 10, further comprising:
in a controller parity timeslot intermediating between the controller data timeslot and one of the first data timeslot and the second data timeslot, transmitting a controller parity packet with one or more of the first node and the second node and receiving the controller panty packet with the remainder of the first node and the second node; and
wherein the controller parity packet is derived from the controller data packet transmitted during the controller data timeslot.

13. The method according to claim 11, wherein if the method is performed and the controller node does not receive, and is unable to derive using a received parity packet, any data packet transmitted by one of the first node and the second node, a count associated with a node is incremented, and
wherein if the count associated with one or more nodes exceeds a threshold before the controller data timeslot, the one or more nodes with associated counts exceeding the threshold are scheduled to transmit data packets in the first data timeslot and the second data timeslot.

14. A method of operating a node of a network including a first node and a second node, the method comprising:
in a first data timeslot, transmitting or receiving a first data packet associated with a first data timeslot;
in a second data timeslot, transmitting or receiving a second data packet associated with a second data timeslot; and
in a parity timeslot following the first data timeslot and the second data timeslot, transmitting or receiving a parity packet associated with the parity timeslot, the parity packet being derived from a set of the first data packet and second data packet associated with the parity timeslot,
wherein the parity timeslot includes a synchronous parity timeslot.

15. The method according to claim 14, further comprising:
during the synchronous parity timeslot,
if the node previously transmitted, successfully received, or derived using a previously received parity packet, the first data packet and second data packet associated with the synchronous parity timeslot, transmitting a parity packet derived from the first data packet and second data packet, and
otherwise, receiving a parity packet.

16. The method according to claim 14, wherein the parity timeslot further includes a single transmitter parity timeslot, associated with the node of the network; and
the method further comprising:
during the single transmitter parity timeslot,
if the node is associated with the single transmitter parity timeslot, and the node previously transmitted, successfully received, or derived using a previously received parity packet, the first data packet and the second data packet associated with the synchronous parity timeslot, transmitting a parity packet derived from the first data packet and the second data packet, and
otherwise, receiving the parity packet.

17. The method according to claim 14, wherein the first data packet and second data are timestamped and received first data packet and second data are used to synchronize clock of the node with clocks of other nodes of the network.

18. One or more non-transitory storage media comprising computer instructions executable by one or more processors, the computer instructions when executed by the one or more processors causing the processors to perform a method according to claim 14.

19. The method according to claim 1, wherein the parity timeslot further includes a transmitter parity timeslot, and the synchronous parity timeslot and the transmitter parity timeslot differ depending on a coding scheme used to derive the parity packet transmitted in a timeslot.

20. The method according to claim 14, wherein the parity timeslot further includes a transmitter parity timeslot, and the synchronous parity timeslot and the transmitter parity timeslot differ depending on a coding scheme used to derive the parity packet transmitted in a timeslot.

21. A node apparatus comprising:
a transmitter configured to, in a first data timeslot, transmit a first data packet to another node of a network including the node apparatus, the another node receiving the first data packet in the first data timeslot; and
a receiver configured to, in a second data timeslot, receive a second data packet transmitted from the another node, the another node transmitting the second data packet in the second data timeslot,
wherein the transmitter, in a parity timeslot following the first data timeslot and the second data timeslot, transmits a parity packet to the another node, wherein the parity packet is derived from a set of one or a plurality of the first data packet and the second data packet transmitted during the first data timeslot and the second data timeslot, and the parity timeslot includes a synchronous parity timeslot.

22. A node apparatus comprising:

a transmitter configured to, in a first data timeslot, transmit a first data packet to another node of a network including the node apparatus, the another node receiving the first data packet in the first data timeslot; and a receiver configured to, in a second data timeslot, receive a second data packet transmitted from the another node, the another node transmitting the second data packet in the second data timeslot, wherein the transmitter, in a parity timeslot following the first data timeslot and the second data timeslot, transmits a parity packet to the another node, the parity packet being derived from a set of the first data packet and second data packet associated with the parity timeslot, the another node receives the parity packet in the panty timeslot, and the parity timeslot includes a synchronous parity timeslot.

\* \* \* \* \*